US008621390B1

(12) United States Patent
Findley et al.

(10) Patent No.: US 8,621,390 B1
(45) Date of Patent: Dec. 31, 2013

(54) TABLE OF CONTENTS MENU OVER ELECTRONIC BOOK CONTENT ON AN ELECTRONIC PAPER DISPLAY

(75) Inventors: Sean J. Findley, Gilroy, CA (US);
Edward J. Gayles, Tracy, CA (US);
Martin Görner, Meudon (FR)

(73) Assignee: Amazon Technologies, Inc., Reno, NV (US)

( * ) Notice: Subject to any disclaimer, the term of this patent is extended or adjusted under 35 U.S.C. 154(b) by 413 days.

(21) Appl. No.: 12/255,551

(22) Filed: Oct. 21, 2008

(51) Int. Cl.
*G06F 3/048* (2013.01)

(52) U.S. Cl.
USPC .......................... 715/818; 715/819; 715/820

(58) Field of Classification Search
USPC ......... 715/277, 764, 766, 776, 810, 818, 819, 715/820; 345/901, 902, 87, 173–176; 382/181, 312; 358/1.18
See application file for complete search history.

(56) References Cited

U.S. PATENT DOCUMENTS

| 5,524,201 | A  | * | 6/1996  | Shwarts et al. ............... 715/763 |
| 5,632,022 | A  | * | 5/1997  | Warren et al. ................ 715/776 |
| 5,663,748 | A  | * | 9/1997  | Huffman et al. ............. 345/173 |
| 6,243,071 | B1 | * | 6/2001  | Shwarts et al. ............... 715/823 |
| 6,301,583 | B1 | * | 10/2001 | Zellweger ..................... 715/810 |
| 6,320,591 | B1 | * | 11/2001 | Griencewic .................. 345/582 |
| 6,331,867 | B1 | * | 12/2001 | Eberhard et al. ............. 715/864 |
| 6,449,627 | B1 | * | 9/2002  | Baer et al. ..................... 715/206 |
| 7,185,274 | B1 | * | 2/2007  | Rubin et al. .................. 715/205 |
| 7,243,299 | B1 | * | 7/2007  | Rubin et al. .................. 715/209 |
| 7,260,781 | B2 | * | 8/2007  | DeMello et al. .............. 715/711 |
| 2001/0007980 | A1 | * | 7/2001  | Ishibashi et al. ................ 705/26 |
| 2002/0035697 | A1 | * | 3/2002  | McCurdy et al. ............. 713/200 |
| 2002/0123336 | A1 | * | 9/2002  | Kamada ........................ 455/420 |
| 2003/0014674 | A1 | * | 1/2003  | Huffman et al. ............. 713/300 |
| 2004/0139400 | A1 | * | 7/2004  | Allam et al. .................. 715/526 |
| 2004/0225994 | A1 | * | 11/2004 | Wason et al. ................. 717/100 |
| 2004/0268253 | A1 | * | 12/2004 | DeMello et al. .............. 715/526 |
| 2005/0005246 | A1 | * | 1/2005  | Card et al. .................... 715/776 |
| 2005/0076312 | A1 | * | 4/2005  | Gardner et al. ............... 715/853 |
| 2006/0130120 | A1 | * | 6/2006  | Brandyberry et al. ........ 725/136 |
| 2007/0052725 | A1 | * | 3/2007  | Ostojic et al. ................ 345/625 |
| 2008/0163039 | A1 | * | 7/2008  | Ryan et al. .................... 715/206 |
| 2008/0222552 | A1 | * | 9/2008  | Batarseh et al. .............. 715/776 |
| 2008/0288894 | A1 | * | 11/2008 | Han et al. ...................... 715/855 |

OTHER PUBLICATIONS

ANSI/NISO Z39.86-2005, Specifications for the digital talking book: an American national standard, developed by the National Information Standards Organization; approved Apr. 21, 2005.*

(Continued)

*Primary Examiner* — Steven Sax
*Assistant Examiner* — Wilson Varga
(74) *Attorney, Agent, or Firm* — Lee & Hayes, PLLC

(57) ABSTRACT

A method for providing table-of-contents extensions for items displayed on an electronic device may include displaying contents of the item other than a table of contents for the item. The method may also include receiving user selection of a navigation option while the contents of the item are being displayed. The navigation option may correspond to a part of the item that is listed in the table of contents for the item. The method may also include navigating to the part of the item corresponding to the navigation option in response to the user's selection of the navigation option.

22 Claims, 19 Drawing Sheets

(56) References Cited

OTHER PUBLICATIONS

Open Packaging Format (OPF) 2.0 v1.0, International Digital Publishing Forum (IDPF), recommended specification, dated Sep. 11, 2007. Also specifies an NCX, a declarative table of contents.*

Reenskaug, Trygve; "Models-Views-Controllers" published Dec. 10, 1979 by the Smalltalk group at Xerox PARC. Retrieved from the internet at http://heim.ifi.uio.no/~trygver/themes/mvc/mvc-index.html on Oct. 8, 2010.*

Amazon Kindle Publishing Guidelines, Version 1.3, retrieved from the internet from http://s3.amazonaws.com/kindlegen/AmazonKindlePublishingGuidelinesV1.3.pdf on Feb. 4, 2011.*

Kindle User's Guide, 2nd edition, © 2004-2007 Amazon Technologies, Inc.*

"Correspond" and synonyms from "Agree". The American Heritage Dictionary of the English Language. Boston: Houghton Mifflin, 2007. Credo Reference. Dec. 12, 2007. Web. Dec. 5, 2012. <http://www.credoreference.com/entry/hmdictenglang/correspond>.*

"Correspond." Chambers 21st Century Dictionary. London: Chambers Harrap, 2001. Credo Reference. Jan. 1, 2002. Web. Dec. 5, 2012. <http://www.credoreference.com/entry/chambdict/correspond>.*

Sedgewick, Robert, "Algorithms", 1988, Addison-Wesley, ISBN 0-201-06673-4, pp. ix and x.*

"Adobe Reader 8 User Guide", <<http://www.adobe.com/products/reader/pdfs/reader_user_guide.pdf>>, Adobe Systems Incorporated, 2006, 142 pages.

* cited by examiner

| ID 1044 | Title 1054 | Class 1042 | Level 1056 | Parent 1058 | First Child 1060 | Position 1018 | Length 1062 |
|---|---|---|---|---|---|---|---|
| AAAA | Author's Note | title page | 0 | | | 3200 | 1200 |
| AAAB | Part One | book | 0 | | AABA | 4400 | 240000 |
| AAAC | Part Two | book | 0 | | AACA | 244400 | 380000 |
| AABA | The Houses, 1969 | chapter | 1 | AAAB | | 4500 | 13000 |
| AABB | Rock and Roll, 1962 | chapter | 1 | AAAB | | 21500 | 25000 |
| AABC | The Empress, 1928-1947 | chapter | 1 | AAAB | | 46500 | 58000 |
| AACA | The Swimming Pool, 1980 | chapter | 1 | AAAC | | 244400 | 244400 |

TOC Table 1010

Record 1052

FIG. 10

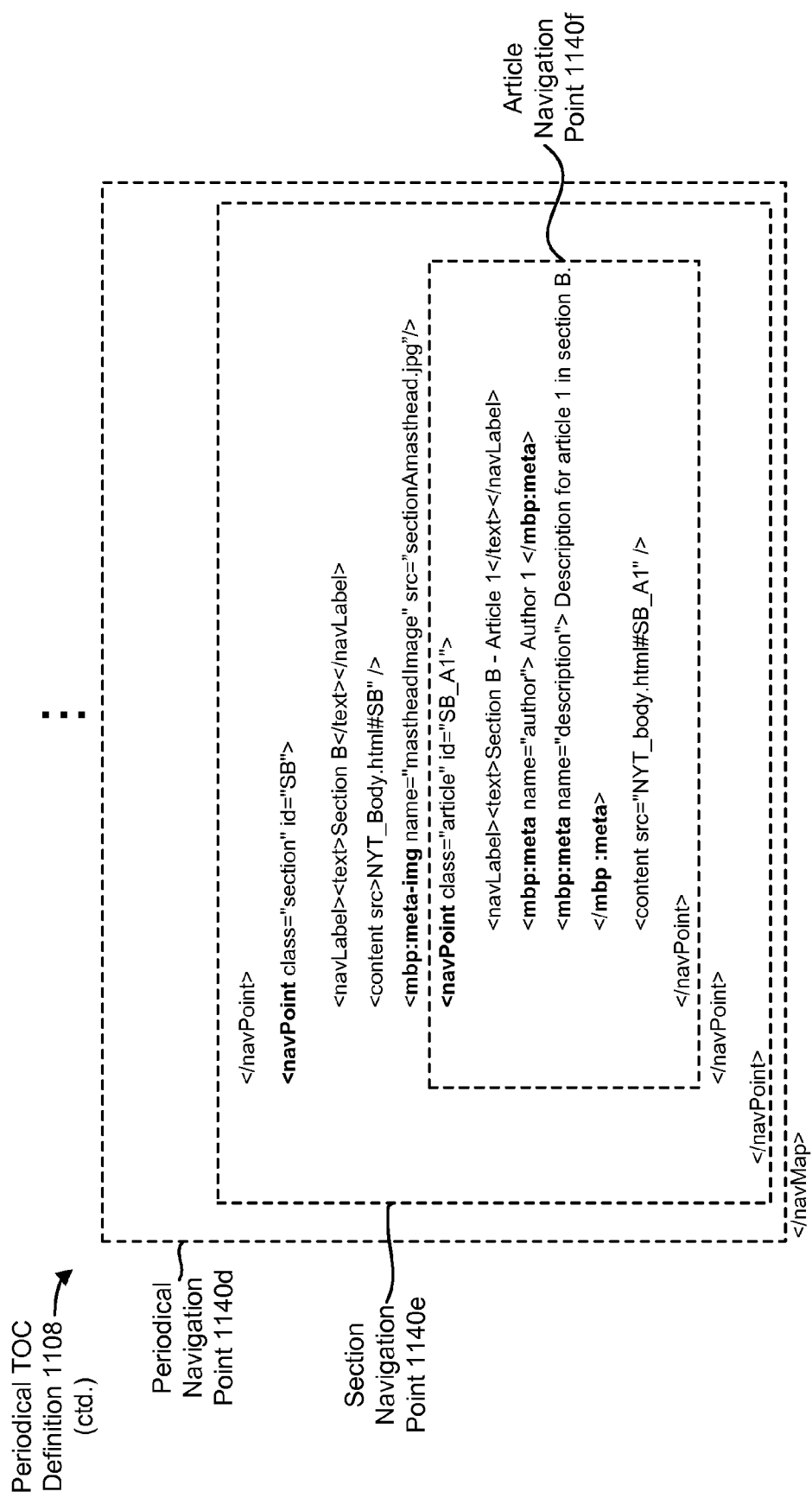
FIG. 11 (ctd.)

| ID 1344 | Title 1354 | Level 1356 | Parent 1358 | First Child 1360a | Last Child 1360b | Position 1318 | Length 1362 | Class 1342 | X1 1372a | X2 1372b | X3 1372c |
|---|---|---|---|---|---|---|---|---|---|---|---|
| 0 | Author's Note | 0 | | | | 3200 | 1200 | title page | •A Biographer •A Second Biographer •A Third Biographer | •The following text is not real. If it had been real, you would have been notified. •This is another description | •153 •175 (records containing images) |
| 1 | Part One | 0 | | 3 | 5 | 4400 | 240000 | book | | | |
| 2 | Part Two | 0 | | 6 | 6 | 244400 | 380000 | book | | | |
| 3 | The Houses, 1969 | 1 | 1 | | | 4500 | 13000 | chapter | | | |
| 4 | Rock and Roll, 1962 | 1 | 1 | | | 21500 | 25000 | chapter | | | |

FIG. 13

TABLE OF CONTENTS MENU OVER ELECTRONIC BOOK CONTENT ON AN ELECTRONIC PAPER DISPLAY

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. Benefits may be realized from improved systems and methods for interacting with an electronic device.

BRIEF DESCRIPTION OF THE DRAWINGS

FIG. 10 illustrates an example of a TOC table that may include the information that is contained within a TOC definition;

FIG. 13 illustrates an example of a TOC table corresponding to a TOC definition that includes properties;

DETAILED DESCRIPTION

Figure 1:
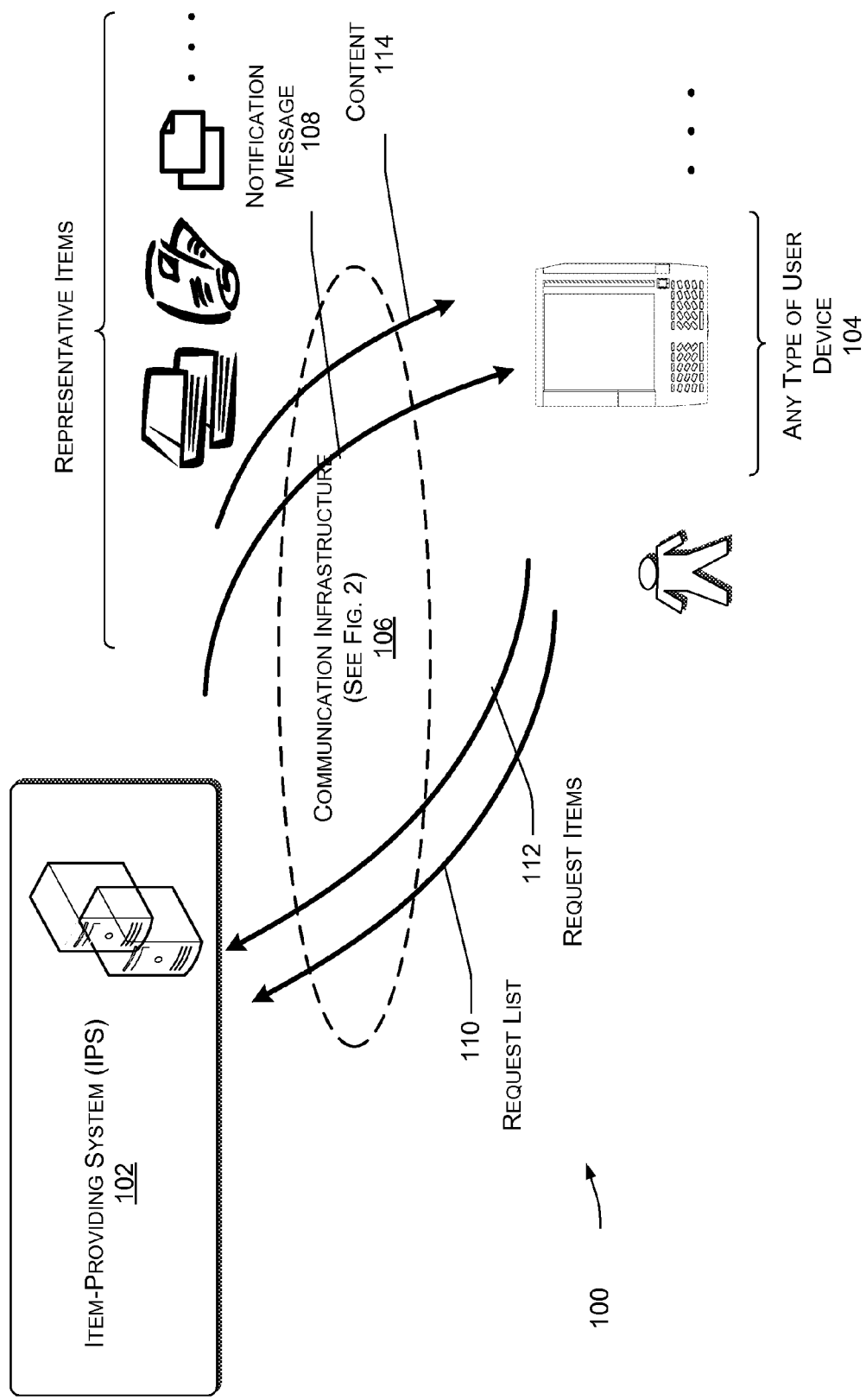
FIG. 1 is a block diagram illustrating a system for downloading items from an Item Providing System (IPS) to a user device.

A method for providing table-of-contents extensions for items displayed on an electronic device is disclosed. The method may include displaying contents of the item other than a table of contents for the item. The method may also include receiving user selection of a navigation option while the contents of the item are being displayed. The navigation option may correspond to a part of the item that is listed in the table of contents for the item. The method may also include navigating to the part of the item corresponding to the navigation option in response to the user's selection of the navigation option.

The item may be an electronic book (e-book), and the navigation option may correspond to a chapter of the e-book. The electronic device may be an electronic book (e-book) reader. Alternatively, the item may be a periodical, and the navigation option may correspond to an article within the periodical. Alternatively still, the item may be a periodical and the navigation option may correspond to a section within the periodical.

The method may also include displaying a navigation menu while the contents of the item are being displayed. The user's selection of the navigation option may be received via the navigation menu. Alternatively, the user's selection of the navigation option may be received via a keyboard shortcut.

The method may also include displaying a table of contents menu while the contents of the item are being displayed. The table of contents menu may comprise information from the table of contents for the item.

The method may also include accessing a table of contents table stored on the electronic device. The table of contents table may correspond to a table of contents definition that comprises a plurality of navigation points defined therein. The table of contents definition may further include at least one property defined therein.

An electronic device that is configured for providing table-of-contents extensions for items displayed on the electronic device is disclosed. The electronic device includes a processor and memory in electronic communication with the processor. The electronic device may also include instructions stored in the memory. The instructions may be executable to display contents of the item other than a table of contents for the item. The instructions may also be executable to receive user selection of a navigation option while the contents of the item are being displayed. The navigation option may correspond to a part of the item that is listed in the table of contents for the item. The instructions may also be executable to navigate to the part of the item corresponding to the navigation option in response to the user's selection of the navigation option.

A computer-readable medium for providing table-of-contents extensions for items displayed on an electronic device is disclosed. The computer-readable medium may include executable instructions for displaying contents of the item other than a table of contents for the item. The instructions may also be executable for receiving user selection of a navigation option while the contents of the item are being displayed. The navigation option may correspond to a part of the item that is listed in the table of contents for the item. The instructions may also be executable to navigate to the part of the item corresponding to the navigation option in response to the user's selection of the navigation option.

A method for providing table-of-contents extensions for items displayed on an electronic device is disclosed. The method may include displaying contents of a first item other than a table of contents for the first item. The method may also include receiving user selection of a navigation option while the contents of the first item are being displayed. The method may also include navigating to a second item in response to the user's selection of the navigation option. The first and second items may be electronic books (e-books), and the electronic device may be an electronic book (e-book) reader.

As used herein, the term "item" may correspond to any type of content. In one case, an item may correspond to a digital media item. A media item may include, without limitation, text content, image content, audio content, video content, hypertext protocol content, and so on, or any combination of these kinds of content. In addition, or alternatively, an item may include instruction-bearing content, such as machine readable program code, markup language content, script content, and so forth. For instance, an item may correspond to a software upgrade or the like.

More specifically, in one case, the term "item" may refer to a specific unit of merchandisable content, such as a book (e.g., an "eBook"), an issue of a magazine, and so on. Alternatively, an item may refer to smaller parts of a merchandisable unit, such as a chapter of a book or a song in an album. Alternatively, an item may refer to a larger compilation of component items which are related in any manner. For instance, an item may refer to multiple issues of a magazine in a particular year.

In general, the various features described herein may be regarded as optional features, meaning that these features may be omitted or replaced with other features. Further, the various implementations described herein may be supplemented by adding additional features.

FIG. 1 is a block diagram illustrating a system 100 for downloading items from an Item Providing System (IPS) 102 to a user device 104. At the device 104, the user may consume the media items in electronic form, as opposed to traditional hard-copy form. Although not shown, the user device 104 represents one of a potentially great number of user devices.

As explained above, the term "item" has broad connotation. The following list, which is non-exhaustive, identifies representative types of items.

An item may correspond to an e-book item. An e-book item, in turn, may refer to a book in electronic form or to one or more portions of a book (such as a chapter of a book) or to a compilation of multiple books (such as a book series), and so on. An e-book is an example of a general class of items referred to herein as pre-generated items. The term pre-generated item refers to content typically (although not necessarily) provided to a user in response to the user's on-demand request for the content after it has been received and stored by the IPS 102.

An item of content may also correspond to a subscription-related item. A subscription-related item refers to any item the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of the item by the IPS 102, rather than the user's on-demand request for a pre-generated item.

An item may also correspond to a personal document item, or simply "personal item." A personal item refers to a document the user forwards in advance to the IPS 102, whereupon the IPS 102 converts the item to a device-readable format.

An item may also correspond to audio content, such as a piece of music, a collection of music, an audio book, and so on. An item may also correspond to a bundle of information generated in response to a query made by the user. An item may also correspond to instruction-bearing content, such as a software update. An item may also correspond to advertising material downloaded to the user device by any entity or combination of entities. Various rules may be applied to govern the downloading of this type of item.

An item may also correspond to a sample of a more complete version of the item. In one case, a sample-type item may embed one or more links to allow the user to acquire its full-version counterpart, or another part (e.g., chapter) of the item. In another case, a publisher or author may release an e-book or other item in a series of installments. Each installment may be regarded as an item.

The item-providing system (IPS) 102 corresponds to any functionality or combination of functionality for forwarding items to the user device 104. In one case, the IPS 102 may correspond to network-accessible server-based functionality, various data stores, and/or other data processing equipment. The IPS 102 may be implemented by a single collection of functionality provided at a single physical site. Alternatively, the IPS 102 may be implemented by multiple collections of functionality, optionally provided at plural physical sites. The IPS 102 may be administered by a single entity or plural entities.

In one case, the IPS 102 corresponds to an entity which provides items to users upon the users' purchase of the items. In this role, the IPS 102 may essentially act as a bookseller or the like. In one particular commercial environment, the IPS 102 may also offer services which allow users to purchase hard-copy books for physical delivery to the users; in this context, the IPS 102 may allow users to download electronic items to respective user devices as part of its entire suite of services. In other cases, the IPS 102 corresponds to an entity which provides items to users on a non-fee basis or on the basis of some other type of alternative compensation arrangement. Thus, the term "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning the user may freely carry the user device 104 from one location to another. In one particular case, the user device is designed as a book reader device, also known as an e-book reader device. In this case, the user device 104 functions as the electronic counterpart of a paper-based book. The user may hold the user device 104 in a manner similar to a physical book; the user may electronically turn the pages of the book, and so on.

Without limitation, FIG. 1 illustrates a particular type of e-book reader device. Additional details regarding this particular type of reader device are provided below. Alternatively, the user device 104 may correspond to any other type of portable device, such as a portable music player, a personal digital assistant (PDA), a mobile telephone, a game module, a laptop computer, and so on, and/or any combination of these types of devices. Alternatively, or in addition, the user device 104 may correspond to a device which is not readily portable, such as a personal computer, a set-top box associated with a television, a gaming console, and so on.

A communication infrastructure 106 bi-directionally couples the IPS 102 to the user device 104. Namely, the IPS 102 downloads items, upgrades, and/or other information to the user device 104 via the communication infrastructure 106. The IPS 102 receives various instructions and other data from the user device 104 via the communication infrastructure 106.

The communication infrastructure 106 may include any combination of communication functionality, including any combination of hardwired links and/or wireless links, etc. For instance, FIG. 2 (to be discussed below in turn) shows one implementation of the communication infrastructure 106 which includes a combination of a Wide Area Network (WAN) 212 and wireless infrastructure. By virtue of the wireless component of the communication infrastructure 106, the user may use the user device 104 to purchase items and consume items without being tethered to the IPS 102 via hardwired links. Thus, for instance, a user may purchase and consume an e-book using the device while riding in a car as a passenger, while hiking in a park, while boating on a lake, and so forth.

FIG. 1 shows four exchanges which describe, in very high-level form, part of a procedure for downloading items to the user. In a first message 108, the IPS 102 may send a notification message to the user device 104. The notification message 108 instructs the user device 104 to download one or more items from the IPS 102 and/or perform other actions. In a second message 110, the user device 104 requests the IPS 102 to supply a list which identifies one or more items to be downloaded (and/or other actions to be performed, such as, in one case, sending information back to the IPS 102).

The user device 104 receives the list from the IPS 102 in response to the second message 110 (note FIG. 1 does not specifically identify the transmission of the list from the IPS 102 to the user device 104). If the instructions identify items to be downloaded, in a third message 112, the user device 104 sends a request to the IPS 102, asking the IPS 102 to download the items identified in the list. In a fourth message 114, the IPS 102 downloads the requested items to the user device 104. In effect, the user device 104 retrieves the items using a pull approach, but the pull approach is initiated by a push operation (by virtue of the IPS 102 "pushing" a notification message 108 to the user device 104).

Figure 2:
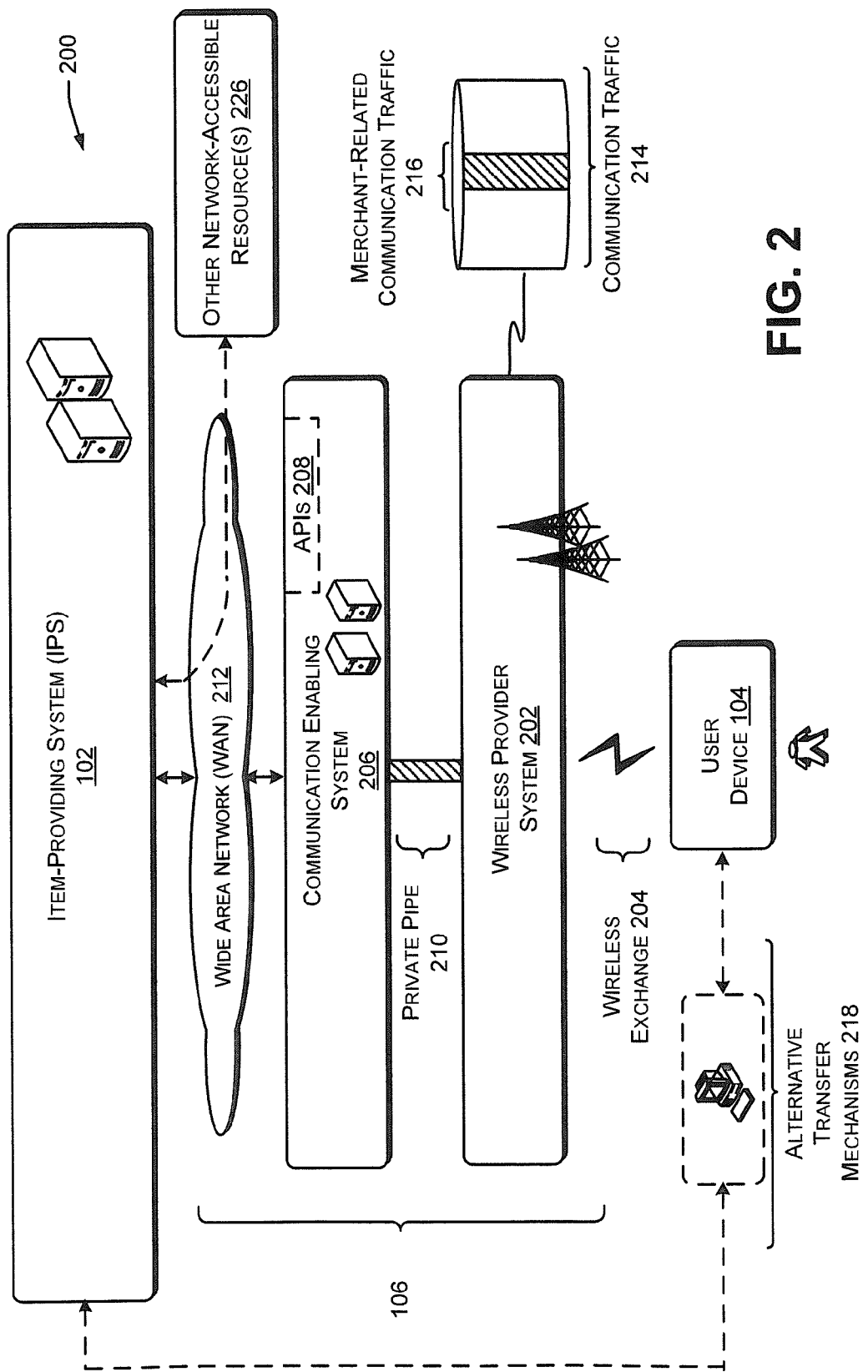
FIG. 2 shows a system which represents one illustrative implementation of the general system of FIG. 1.

FIG. 2 shows a system 200 which represents one illustrative implementation of the general system 100 of FIG. 1. By way of overview, the system 200 includes the components identified above, namely IPS 102 coupled to a user device 104 via communication infrastructure 106.

The communication infrastructure 106 may include multiple components. A first component may be a wireless provider system 202. The wireless provider system 202 corresponds to any infrastructure for providing a wireless exchange 204 with the user device 104. In one case, the wireless provider system 202 is implemented using various data processing equipment, communication towers, and so forth (not shown). The wireless provider system 202 may handle communication traffic 214, where a subset of the communication traffic represents merchant-related communication traffic 216.

Alternatively, or in addition, the wireless provider system 202 may rely on satellite technology to exchange information with the user device 104. The wireless provider system 202 may use any form of electromagnetic energy to transfer signals, such as, without limitation, radio-wave signals. The wireless provider system 202 may use any communication technology to transfer signals, such as, without limitation, spread spectrum technology, implemented, for instance, using the Code Division Multiple Access (CDMA) protocol. The wireless provider system 202 may be administered by a single entity or by a cooperative combination of multiple entities.

The communication infrastructure 106 may also include a communication-enabling system 206. One purpose of the communication-enabling system 206 is to serve as an intermediary in passing information between the IPS 102 and the wireless provider system 202. The communication-enabling system 206 may expose one or more Application Programming Interfaces (APIs) 208. The communication-enabling system 206 may be implemented in any manner, such as, without limitation, by one or more server-type computers, data stores, and/or other data processing equipment.

The communication-enabling system 206 may communicate with the wireless provider system 202 via a private pipe 210, also referred to as a dedicated communication pipe or dedicated channel. The private pipe 210 is dedicated in the sense it is exclusively used to transfer information between the communication-enabling system 206 and the wireless provider system 202. In contrast, the communication enabling system 206 communicates with the IPS 102 via a non-dedicated communication mechanism, such as a public Wide Area Network (WAN) 212. For example, the WAN 212 may represent the Internet. In one case, the Wide Area Network (WAN) 212 may also provide access to other network-accessible resource(s) 226.

The users may access the IPS 102 through alternative communication routes which bypass the wireless provider system 202. For instance, as indicated by alternative access path 218, a user may use a personal computer or the like to access the IPS 102 via the Wide Area Network (WAN) 212, circumventing the wireless provider system 202 and the communication-enabling system 206. The user may download items through this route in conventional fashion. The user may then transfer the items from the personal computer to the user device 104, e.g., via a Universal Serial Bus (USB) transfer mechanism, through the manual transfer of a portable memory device, and so on. This mode of transfer may be particularly appropriate for large files, such as audio books and the like. Transferring such a large amount of data in wireless fashion may have a relatively high cost. However, the system 200 may also be configured to transfer large files (such as audio files) via the wireless exchange 204.

Figure 3:
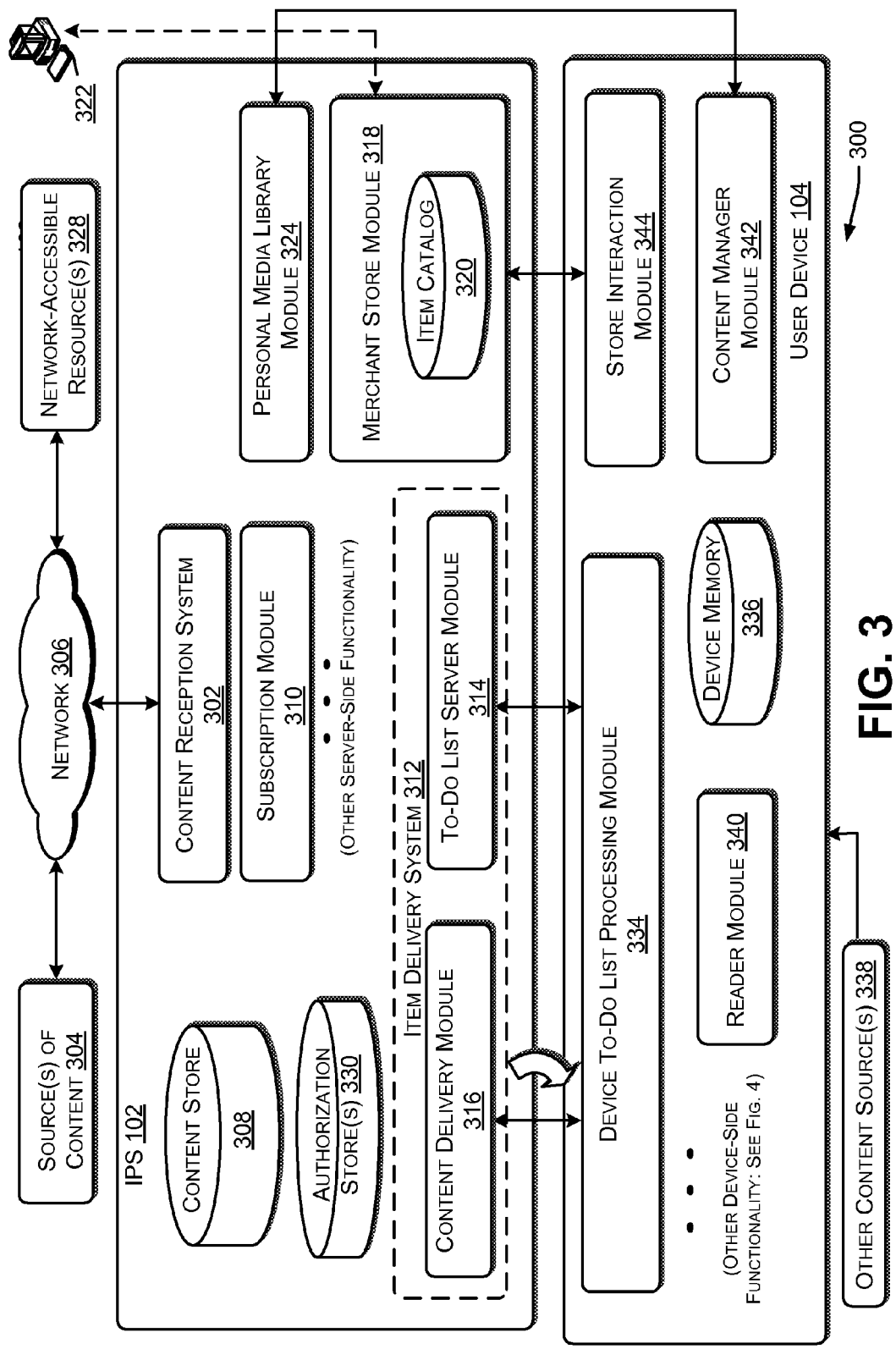
FIG. 3 shows a system including a more detailed depiction of the IPS and the user device.

FIG. 3 shows a system 300 including a more detailed depiction of the IPS 102 and the user device 104 (which were introduced in FIGS. 1 and 2). Although not shown, the system 300 shown in FIG. 3 may use the wireless features shown in FIG. 2.

In another implementation, the system 300 may use some other communication infrastructure than is shown in FIG. 2, which may optionally omit the use of wireless communication.

Addressing the details of the IPS 102 first, this system 102 performs various functions. Different modules are associated with these different functions. One module is a content reception system 302. The content reception system 302 receives content from one or more sources of content 304. The sources 304 may represent any type of provider of content, such as e-book publishers, newspaper publishers, other publishers of periodicals, various feed sources, music sources, and so on.

The sources 304 may be administered by a single entity or may be administered by separate respective entities. Further, the entity administering the IPS 102 may correspond to a same entity which administers one or more of the sources 304. Alternatively, or in addition, the entity administering the IPS 102 may interact with one or more different entities administering one or more respective sources 304. In the latter case, the entity administering the IPS 102 may enter into an agreement with the source entities to receive content from these source entities.

In the above example, the entities associated with the sources 304 may correspond to commercial organizations or other types of organizations. In another case, one or more of the sources may correspond to individual users, such as the creators of the items. For example, a user may directly provide items to the IPS 102. Alternatively, or in addition, a user may supply content to a community repository of items, and the IPS 102 may receive content from this repository, and so on.

The content reception system 302 may obtain the content through various mechanisms. In one case, the content reception system 302 obtains the content via one or more networks 306. The networks 306 may represent a WAN, such as the Internet, a Local Area Network (LAN), or some combination thereof. In one case, the network 306 may also provide access to other network-accessible resource(s) 328. The content reception system 302 may receive the information in various forms using any protocol or combination of protocols. For instance, the content reception system 302 may receive the information by making a Hypertext Transfer Protocol (HTTP) request, by making a File Transfer Protocol (FTP) request, by receiving a feed (e.g., an RSS feed), and so forth.

In another case, the IPS 102 may obtain content via a peer-to-peer (P2P) network of sources 304. More generally, the content reception system 302 may proactively request the content in an on-demand manner (based on a pull method of information transfer). Or the content reception system 302 may receive the content in response to independent transfer operations initiated and performed by the sources 304 (based on a push method of information transfer). Alternatively, the content reception system 302 may use a combination of pull and push transfer mechanisms to receive the content.

The content reception system 302 may receive content in the form of items. Without limitation, the items may include e-books, audio books, music, magazine issues, journal issues, newspaper editions, various feeds, and so forth. In one case, the content reception system 302 may receive some items expressed in a format not readable by the user device 104 (where the user device may optionally be configured to receive, process, and present content expressed in one or more predefined formats). To address this situation, the content reception system 302 may convert the items from their original format into a device-readable format (such as, without limitation, the .mobi format).

The content reception system 302 stores the items received (and optionally converts them to another format) in a content store 308. The content store 308 includes one or more storage systems for retaining items in electronic form, located at a single site or distributed over plural sites, administered by one or more entities.

The IPS 102 also includes a subscription module 310. The subscription module 310 manages users' subscriptions to subscription-related items. Generally, a subscription entitles a user to receive one or more subscription-related items (which are yet to be received and stored by the content reception system 302) based on any type of consideration or combination of considerations. Without limitation, subscription-related item types include magazines, journals, newsletters, newspapers, various feeds, and so forth. Users may arrange to receive subscription-related items by purchasing such subscriptions, or, more generally, by registering to receive such subscriptions (which, in some cases, may not involve the payment of a fee).

Alternatively, or in addition, the IPS 102 may automatically register users to receive subscription-related items without the involvement of the users (and possibly without the approval of the users). The latter scenario may be appropriate in the case in which the IPS 102 (or some other entity) registers a user to receive unsolicited advertisements, newsletters, and so on. The system 300 may allow the user to opt out of receiving such unsolicited information.

The IPS 102 may consult the subscription module 310 to determine which user devices should receive a newly-received subscription-related item. For instance, upon receiving an electronic issue of the magazine Forbes, the IPS 102 consults the subscription module 310 to determine the users who have paid to receive this magazine. The IPS 102 then sends the issue to the appropriate user devices.

An item delivery system 312 represents the functionality which actually performs the transfer of content to the user device 104. In one illustrative representation, the item-delivery system 312 includes two components: a to-do list server module 314 and a content delivery module 316. The to-do list server module 314 generally provides instructions for the user device 104. The instructions direct the user device 104 to retrieve items and perform other operations. The content delivery module 316 allows the user device 104 to obtain the items identified in the instructions received from the to-do list server module 314.

More specifically, in a first phase of information retrieval, the to-do list server module 314 sends a notification message to the user device 104. The user device 104 responds to the notification message by waking up (if "asleep"), which may involve switching from a first power state to a second power state (where the second power state consumes more power than the first power state).

The user device 104 may then contact the to-do list server module 314 to request instructions from the to-do list server module 314. More specifically, for each user device, the to-do list server module 314 maintains a list of entries, also referred to herein as a "to-do queue." An entry provides an instruction for a user device to perform an action. As will be described in greater detail below, there are different instructions that a device may be directed to perform, wherein a collection of instructions defines an IPS-device interaction protocol. One such action (e.g., associated with a GET instruction of the protocol) directs the user device 104 to retrieve an item from a specified location by specifying an appropriate network address (e.g., a URL) and appropriate arguments.

In a first phase of the downloading procedure, the user device 104 may retrieve n such entries, wherein n is an integer. In one scenario, the number n may be a subset of a total number of items in the to-do queue associated with the user device 104. In a second phase of the downloading procedure, the user device 104 may contact the content delivery module 316 to retrieve one or more items identified in the GET-related entries.

In general, after receiving the notification message, the item delivery system 312 may interact with the user device 104 in a data mode, e.g., using the Hypertext Transfer Protocol (HTTP), or some other protocol or combination of protocols.

The IPS 102 may also include a merchant store module 318. The merchant store module 318 may provide access to an item catalog 320, which, in turn, may provide information regarding a plurality of items (such as e-books, audio books, subscription related items, and so on). As will be described in greater detail below, the merchant store module 318 may include functionality allowing a user to search and browse though the item catalog 320. The merchant store module 318 may also include functionality allowing a user to purchase items (or, more generally, acquire items based on any terms).

In one case, a user may interact with the merchant store module 318 via the user device 104 using wireless communication. Alternatively, or in addition, the user may interact with the merchant store module 318 via another type of device 322, such as a personal computer, optionally via wired links. In either case, when the user purchases or otherwise acquires an item via the merchant store module 318, the IPS 102 may invoke the item delivery system 312 to deliver the item to the user.

The IPS 102 may also include a personal media library module 324. The personal media library module 324 may store, for each user, a list of the user's prior purchases. More specifically, in one case, the personal media library module 324 may provide metadata information regarding e-book items and other on-demand selections (e.g., "a la carte" selections, such as subscription issues, etc.) which a user already owns. The personal media library module 324 may also provide links to the items in the content store 308. As will be described in greater detail below, to download an e-book item (or the like) which the user has already purchased, the user device 104 contacts the content delivery module 316.

The content delivery module 316 may interact with permission information and linking information in the personal media library module 324 in order to download the item to the user. In one use scenario, the user device 104 may access the content delivery module 316 in this manner to initiate downloading of an item which has been previously purchased by the user but has been deleted by the user device 104 for any reason.

The IPS 102 may also include various security-related features, such as one or more authorization stores 330. The authorization stores 330 may provide information which enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality," the IPS 102 may include additional functions, many of which are described below.

Now turning to the device-side features of the system 300, the user device 104 may include a device to-do list processing module 334. The purpose of the device to do list processing module 334 may be to interact with the item delivery system 312 to download items from the item delivery system 312. Namely, in a first phase of the downloading procedure, the device to-do list processing module 334 may first receive a notification message from the to-do list server module 314, which prompts it to wake up (if "asleep") and contact the to-do list server module 314 to retrieve a set of n entries.

Each entry may include an instruction which directs the device to-do list processing module 334 to perform an action. In a second phase, for a GET-type entry, the device to-do list processing module 334 may contact the content delivery module 316 to request and retrieve an item identified by the GET-type entry. As will be described in greater detail below, the user device 104 may signal a successful completion of the download process or a failure in the download process.

Upon downloading an item, the user device 104 may store the item in a device side memory 336, which in one example is a flash-type memory and may be any other type of memory in other examples. Although not shown, the user device 104 may also exchange information with any other source of content 338. In one illustrative case, the other source of content 338 may represent a personal computer or other data processing device. Such other source of content 338 may transfer an item to the user device 104 via a Universal Serial Bus (USB) connection and/or any other type(s) of connection(s). In this scenario, the other source of content 338, in turn, may receive the item from the IPS 102 (or other source) via hardwired connection (e.g., non-wireless connection). For example, to receive an audio book, the user may use a personal computer to non-wirelessly download the audio book from a network-accessible source of such content. The user may then transfer the audio book to the user device 104 via USB connection. In another illustrative case, the other source of content 338 may represent a portable memory module of any type, such as a flash type memory module, a magnetic memory module, an optical memory module, and so on.

The user device 104 may also include a reader module 340. The illustrative purpose of the reader module 340 is to present media items for consumption by the user using the user device 104. For example, the reader module 340 may be used to display an e-book to the user to provide a user experience which simulates the reading of a paper-based physical book.

The user device 104 may also include a content manager module 342. The purpose of the content manager module 342 is to allow the user to manage items available for consumption using the user device 104. For example, the content manager module 342 may allow the user to view a list of items available for consumption.

The content manager module 342 may also identify the sources of respective items: one such source corresponds to the device memory 336; another source corresponds to an attached portable memory (e.g., represented by the other source 338); another source corresponds to items identified in the personal media library module 324 (as may be revealed, in turn, by device-side metadata provided by the IPS 102); another source corresponds to subscription-related items identified by the subscription module 310, and so on. The content manager module 342 may allow the user to filter and sort the items in various ways. For example, the user may selectively view items which originate from the device store 336.

The user device 104 may also include a store interaction module 344. The store interaction module 344 may allow the user device 104 to interact with the merchant store module 318. The user may engage the store interaction module 344 to search and browse through items, to purchase items, to read and author customer reviews, and so on. As described above, the user may also use a personal computer or the like to interact with the merchant store module 318 via hardwired links.

Figure 4:
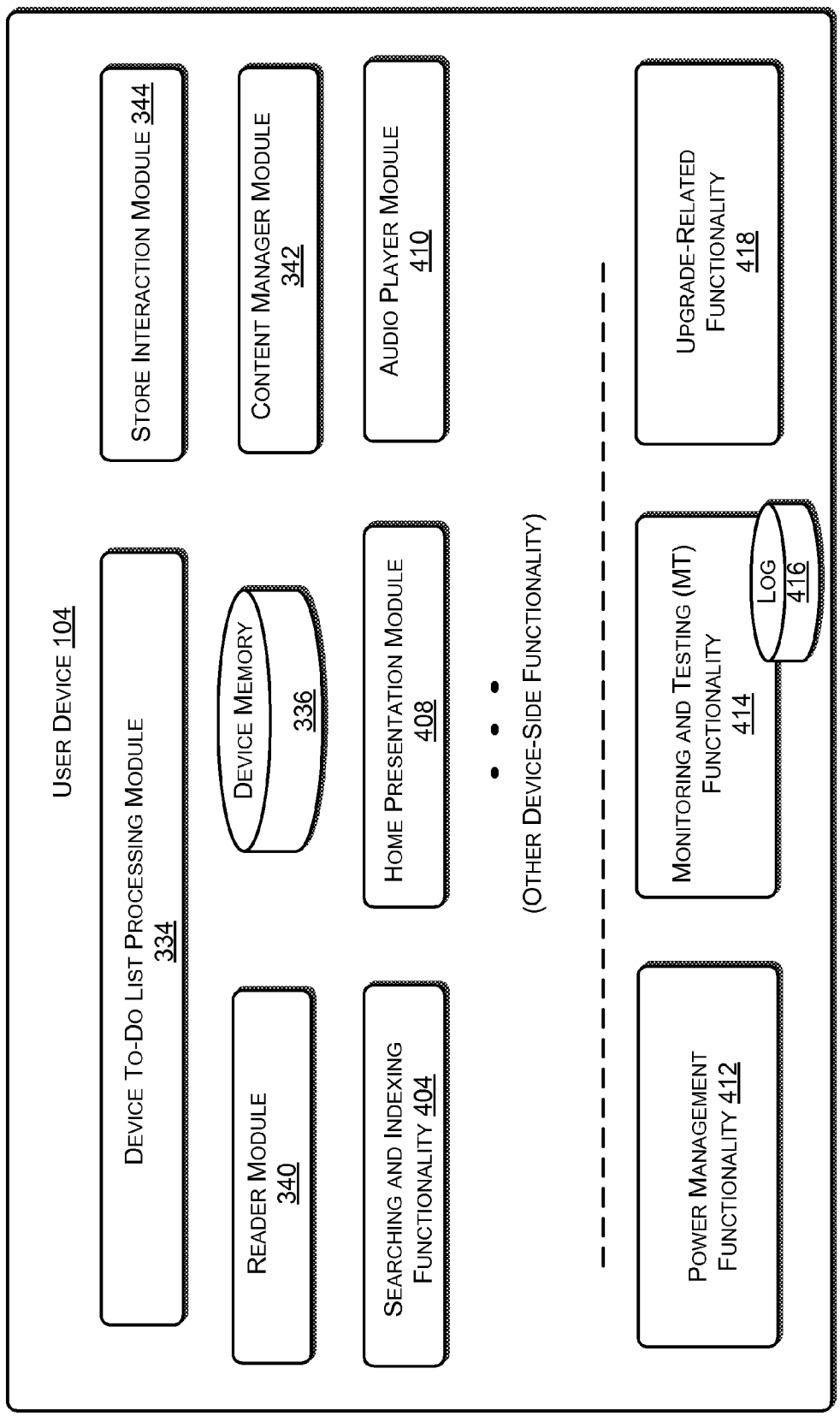
FIG. 4 shows one configuration of the user device.

The above-enumerated list of modules is representative and is not exhaustive of the types of functions performed by the user device 104. As indicated by the label "Other Device-Side Functionality," the user device 104 may include additional functions, many of which are described below. In fact, FIG. 4 shows additional device-side functionality. For completeness, FIG. 4 also identifies the various modules described above, including the device to-do list processing module 334, the device memory 336, the reader module 340, the content manager module 342, and the store interaction module 344. These features perform the functions described above.

FIG. 4 shows one configuration of the user device 104. The user device 104 may include searching and indexing functionality 404. The indexing aspect of this functionality 404 provides a mechanism for indexing an item received from the IPS 102 and/or for interacting with an index generated and supplied by the IPS 102 or by some other source. An index for a particular item (such as an e-book or newspaper edition) identifies the component parts (e.g., words) in the item, linking the component parts to their respective locations in the item. The searching aspect of the functionality 404 provides a mechanism for searching for identified components (e.g., words, phrases, etc.) in an item, and for performing other search-related functions. The searching aspect relies on the indexing aspect.

The user device 104 may also include a home presentation module 408. The home presentation module 408 may provide a home page when the user first turns on the user device and/or at other junctures. The home page may act as a general portal allowing a user to access media items and various features provided by the user device 104. In one illustrative case, the home page may present a summary of some (or all) of the items available for consumption using the user device 104.

The user device 104 may also include an audio play module 410. The audio player module 410 may provide an interface which allows the user to play back and interact with audio items, such as music, audio books and the like.

The above-described features of the user device 104 may pertain to applications with which the user may interact or which otherwise play a high-level role in the user's interaction with the user device 104. The user device 104 may include a number of other features to perform various lower-level tasks, possibly as background-type operations.

Power management functionality 412 performs one such background-type operation. More specifically, the power management functionality 412 corresponds to a collection of hardware and/or software features operating to manage the power consumed by the user device 104. The power management functionality 412 generally operates to reduce the power consumed by the device 104. The power management functionality 412 achieves this goal by selectively powering down features not actively being used (or for which there is an assumption these features are not actively being used). The power management functionality 412 achieves particularly noteworthy power savings by powering down features which make large power demands, such as one or more features associated with wireless communication.

The user device 104 may also include performance Monitoring and Testing (MT) functionality 414. The MT functionality 414 maintains a performance log 416 identifying the behavior of the device 104. The IPS 102 and/or other entities may access the performance log 416, along with other information gleaned from the communication infrastructure 106, to help diagnose anomalies in the operation of the user device 104 and the system 300 as a whole. The MT functionality 414 may also interact with testing functionality provided by the IPS 102 and/or other entities. For example, the MT functionality 414 may respond to test probes generated by the IPS 102.

The user device 104 may also include an upgrade-related functionality 418. The upgrade-related functionality 418 allows the user device 104 to receive and integrate instruction-bearing update items (such as software updates). In one case, the upgrade-related functionality 418 may automatically receive instruction-bearing items provided by the IPS 102 (and/or by other entities). An administrator at the IPS 102 may manually initiate the upgrade procedure by which an instruction-bearing update item is forwarded to the user device 104. Or an automated IPS-side routine may initiate the upgrade procedure. In any event, the user device may receive the instruction-bearing update item without the involvement of the user or with minimal involvement from the user. In this sense, the upgrade procedure may be viewed as "transparent." In another case, the upgrade-related functionality 418 may be operated by the user to manually access a source of instruction-bearing items (such as a prescribed website or the like) and download an item from this source.

To repeat, the above-enumerated list of modules is representative and is not exhaustive of the types of functions performed by the user device 104. As indicated by the label "Other Device-Side Functionality," the user device 104 may include additional functions.

The IPS 102 described above may interact with any type of user device 104. In one case, the user device 104 is a portable-type device, meaning a device designed to be readily carried from location to location. In one specific case, the user device 104 allows the user to consume the media items while holding the user device 104, e.g., in a manner which simulates the way a user might hold a physical book. A portable user device may take the form of an e-book reader device, a portable music player, a personal digital assistant, a mobile telephone, a game module, a laptop computer, and so forth, and/or any combination of these types of devices. Alternatively, or in addition, the user device 104 may correspond to a device not readily portable, such as a personal computer, set-top box associated with a television, gaming console, and so on.

Figure 5:
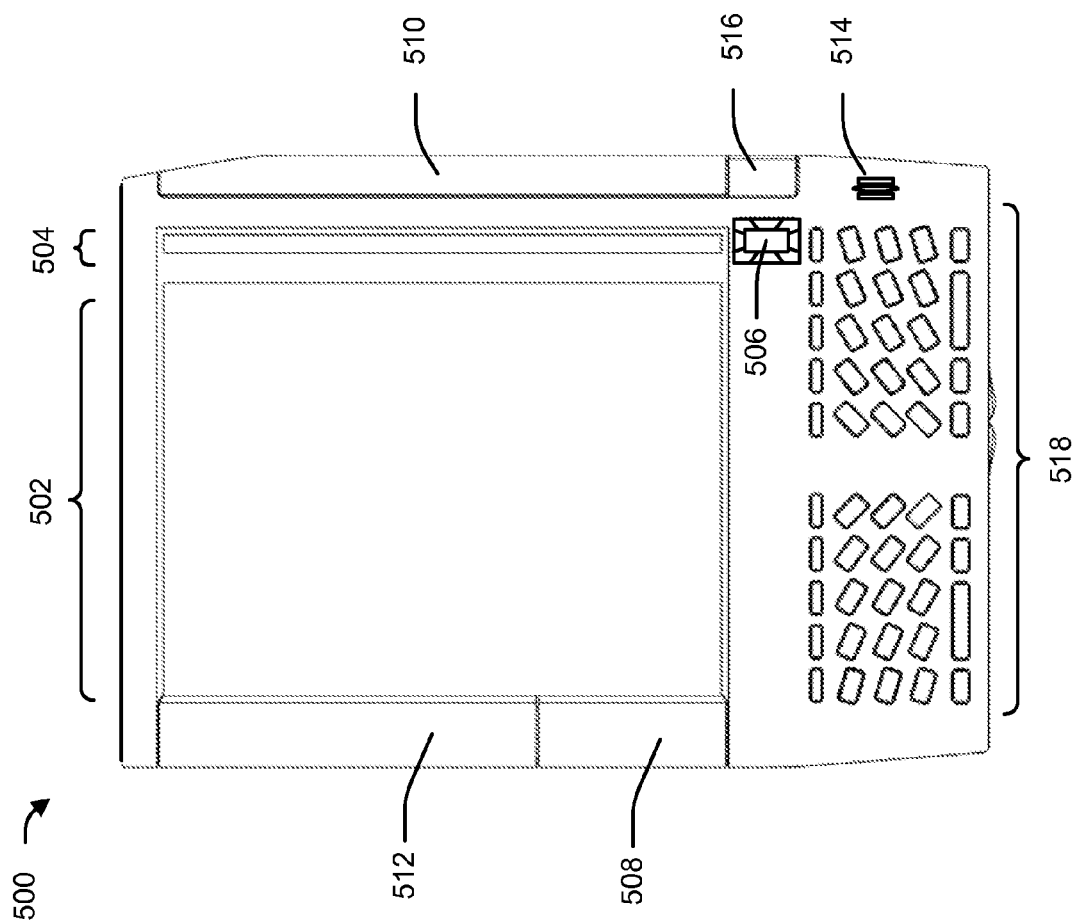
FIG. 5 shows one type of user device which may be used to interact with the IPS.

Without limitation, FIG. 5 shows one type of user device 500 which may be used to interact with the IPS 102. The user device 500 may include a wedge-shaped body designed to fit easily in the hands of a user, generally having the size of a paperback book. Other user devices may adopt different shapes and sizes.

In one representative design, the user device 500 includes two display parts: a main display part 502 and a supplemental display part 504. The main display part 502 presents various pages provided by the store interaction module 344, the reader module 340, and so on. In one case, the supplemental display part 504 is used to present a cursor. The user may position the cursor to identify laterally adjacent portions in the main display part 502. Without limitation, in one illustrative case, the main display part 502 and/or the supplemental display part 504 may be implemented using electronic paper technology, such as provided by E Ink Corporation of Cambridge, Mass. This technology presents information using a non-volatile mechanism; using this technology, the user device 500 may retain information on its display even when the device is powered off.

The user device 500 includes various input keys and mechanisms. A cursor-movement mechanism 506 allows a user to move a cursor within the supplemental display part 504. In one representative case, the cursor-movement mechanism 506 may include a five-way controller 506. The five-way controller 506 may be similar to a joystick, in that it may be moved in four separate directions (e.g., left, right, up, down) or pressed straight down. The five-way controller 506 may be configured to allow the user to select different things by moving the controller 506 in different ways (e.g., select one thing by moving the controller 506 to the right, and select something else by pressing the controller 506 straight down). Other types of selection mechanisms may be used, such as a cursor wheel, a five-button keypad, a trackball, a touch-sensitive display, a series of vertically and/or horizontally arrayed keys along the edge(s) of the main display part 502, one or more graphical scroll bar(s) in the main display part 502, and so on.

The user device 500 also includes various page-turning buttons, such as next page buttons (508, 510) and a previous page button 512. The next page buttons (508, 510) advance the user to a next page in an item (relative to a page that is currently being displayed). The previous page 512 button advances the user to a previous page in an item (relative to a page that is currently being displayed). The user device 500 may also include a page-turning input mechanism 514 actuated by the user's thumb as it passes over the mechanism 514. This user experience simulates the manner in which a user turns a page in a physical book (e.g., by "thumbing through" a book). The user device 500 may also include a back button 516 allowing the user to advance to a previous page when using the browsing module. Although not shown, the user device 500 may include a switch for turning power on and off, a switch for enabling and disabling a wireless interface, and so on. The user device 500 may also include a keyboard 518. The keyboard 518 may include alphanumeric keys. The keys may be shaped and oriented in a manner which facilitates the user's interaction with the keys while the user holds the device 104 in the manner of a physical book. The user may use the keyboard 518 to enter search terms, annotations, URLs, and so forth. The user may also use the keyboard 518 to respond to testing content. The keyboard 518 may also include various special-function keys.

Figure 6:
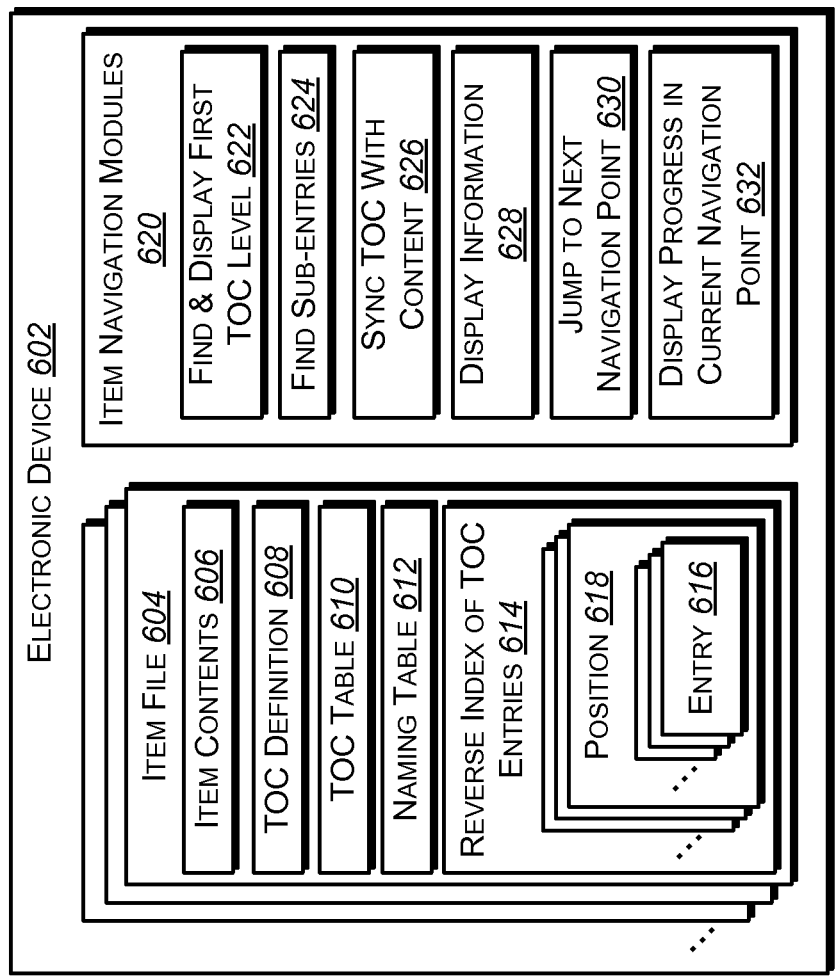
FIG. 6 shows an electronic device that includes multiple files corresponding to items.

Reference is now made to FIG. 6. FIG. 6 shows an electronic device 602, such as an electronic book (e-book) reader. The electronic device 602 includes multiple files 604 corresponding to items. As explained above, the term "item" has broad connotation, and may refer to an eBook item, a subscription-related item (e.g., magazines, journals, newspapers, newsletters), a personal document item, and so forth. Each item file 604 includes various contents 606. Different contents 606 may be included within item files 604 corresponding to different types of items. For example, the contents 606 within an eBook may include various chapters, an index, etc. The contents 606 within a subscription-related item, such as a magazine or newspaper, may include various sections and articles.

To help the user to navigate the contents 606 of an item, the item file 604 may include a table of contents (TOC). One aspect of the present disclosure relates to using the information that is contained within the table of contents for an item to simplify navigation of the item. To facilitate simplified navigation of an item as described herein, an item file 604 may include certain data structures, including a TOC definition 608, a TOC table 610, a naming table 612, and a reverse index 614 of TOC entries 616. The reverse index 614 may include the entries 616 that are associated with each position 618 in an item. In this context, a position 618 may refer to a page, and an entry 616 may refer to a chapter, section, article, etc. Additional information about these data structures will be provided below.

An electronic device 602 may also include various item navigation modules 620. The item navigation modules 620 may include a module 622 for finding and displaying the first table of contents level, a module 624 for finding all the sub-entries that are associated with a given entry 616, a module 626 for synchronizing the table of contents with item contents 606, a module 628 for displaying information while a user is reading the contents 606 of a particular item, a module 630 for jumping to the next navigation point, a module 632 for displaying the progress in the current navigation point, and so forth. Additional information about these item navigation modules 620 will be provided below.

Figure 7:
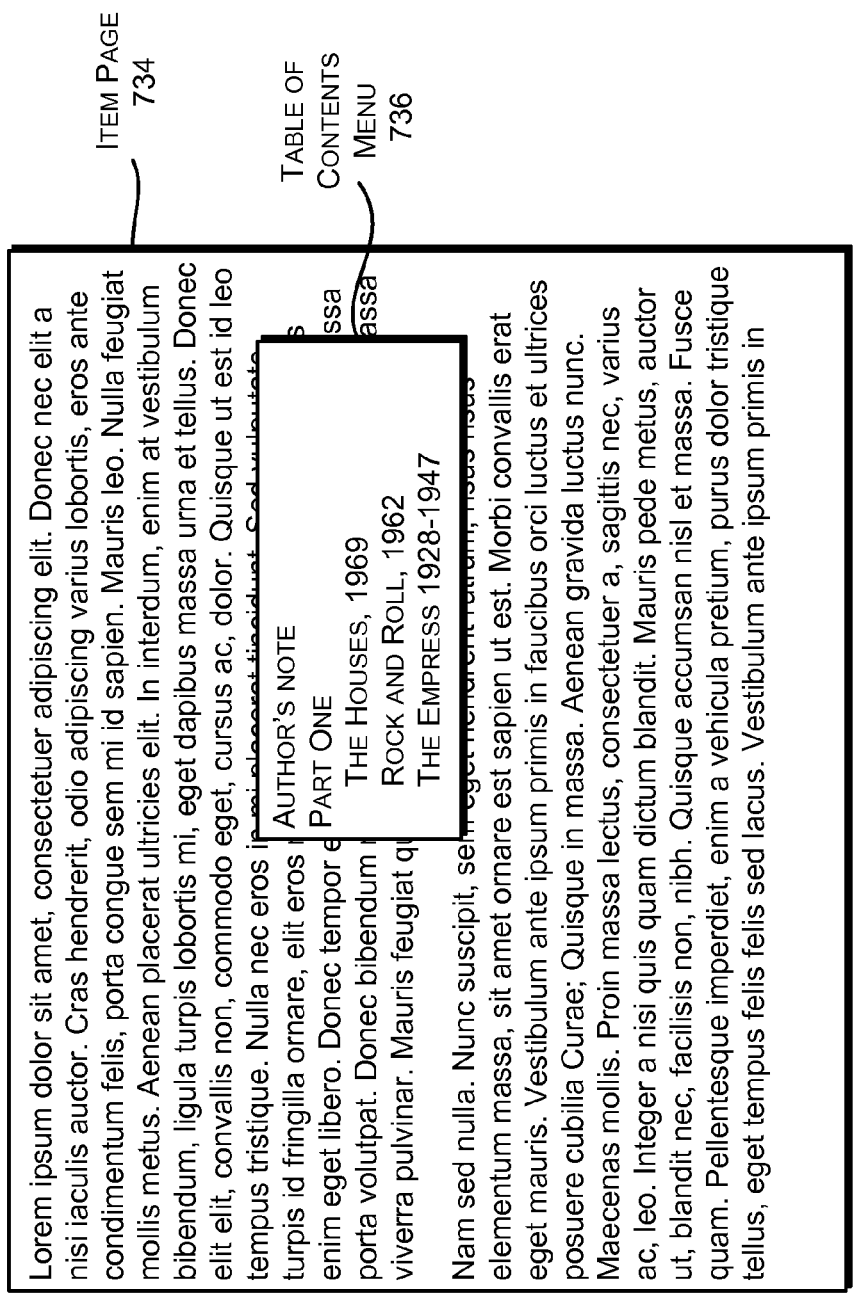
FIG. 7 illustrates a page of an item, as it may be displayed on an electronic device while the user is viewing the item.

Reference is now made to FIG. 7. FIG. 7 illustrates a page 734 of an item, as it may be displayed on an electronic device while the user is reading the item. At some point while the user is reading the item, the user may want to view the table of contents. However, the user may not want to navigate all the way back to the table of contents that is included at the beginning of the item.

One aspect of the present disclosure relates to displaying a table of contents menu 736 while the user is viewing contents of an item on an electronic device (i.e., while the user is viewing something other than the table of contents itself). For example, if the item is an e-book, the user may be in the middle of reading one of the chapters of the e-book. The user may want to view the information contained in the table of contents, but the user may not want to navigate all the way back to the table of contents for the e-book, which is typically located at the beginning of an e-book.

In accordance with the present disclosure, a table of contents menu 736 may be displayed. The table of contents menu 736 may include an entry for each of the chapters of the e-book. This allows the user to view information that is contained within the table of contents without having to navigate all the way back to beginning of the item where the table of contents is displayed. By selecting one of the entries in the table of contents menu 736, the user may navigate to the corresponding location in the item.

Figure 8:
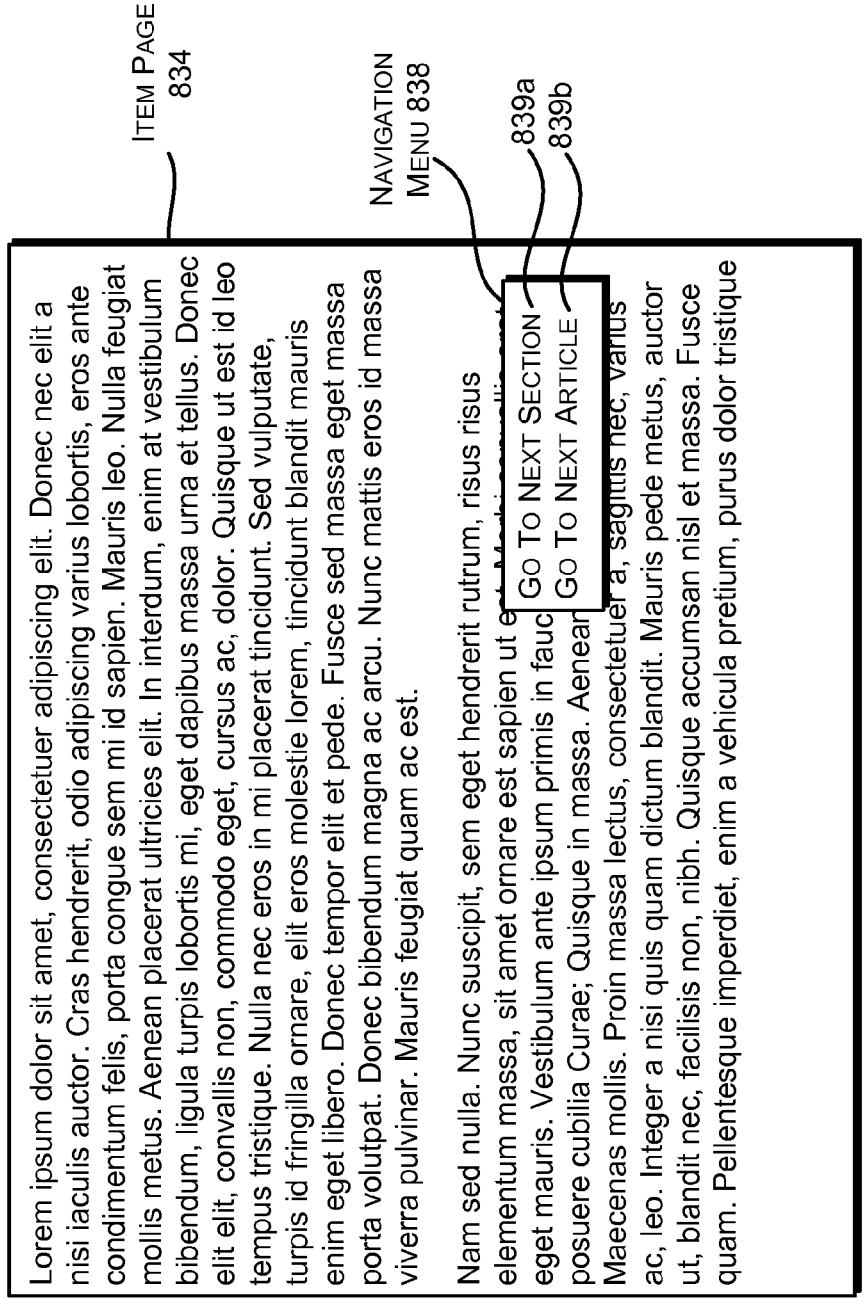
FIG. 8 illustrates a navigation menu that may be displayed while contents of an item are being displayed on the electronic device.

Reference is now made to FIG. 8. FIG. 8 illustrates a different kind of menu, namely a navigation menu 838. The navigation menu 838 may be displayed while contents of an item are being displayed on the electronic device (e.g., while the user is reading a page 834 of an item on an electronic device). The navigation menu 838 includes various navigation options 839. The navigation options 839 may correspond to entries in the table of contents for the item. For example, suppose that the item is a periodical with various sections and articles. These sections and articles may be listed in the table of contents for the periodical. The navigation menu 838 may include a "Go To Next Section" navigation option 839a and a "Go To Next Article" navigation option 839b.

When the user selects a particular navigation option, then the corresponding part of the item may be displayed on the electronic device. For example, if the user selects the "Go To Next Article" navigation option 839b, then the beginning of the next article may be displayed on the electronic device.

Displaying a navigation menu 838 allows the user to quickly navigate to the next part of an item that the user is interested in reading without having to view the rest of the current part of the item. For example, suppose that the user is reading a periodical that has several articles. If the user is halfway through reading one of the articles and the user decides that he or she is no longer interested in reading any more of that article, then the user may cause a navigation menu 838 to be displayed and navigate to the next article by selecting the "Go To Next Article" navigation option 839b.

As an alternative to receiving the user's selection of a navigation option 839 via a navigation menu 838, such as shown in FIG. 8, various navigation options 839 may be associated with keyboard shortcuts on an electronic device. This would allow a user to select a particular navigation option 839 by pressing a key or a combination of keys on an electronic device, without ever having to display a navigation menu 838. For example, certain navigation options 839 may be selected by means of a five-way controller 506.

Figure 9:
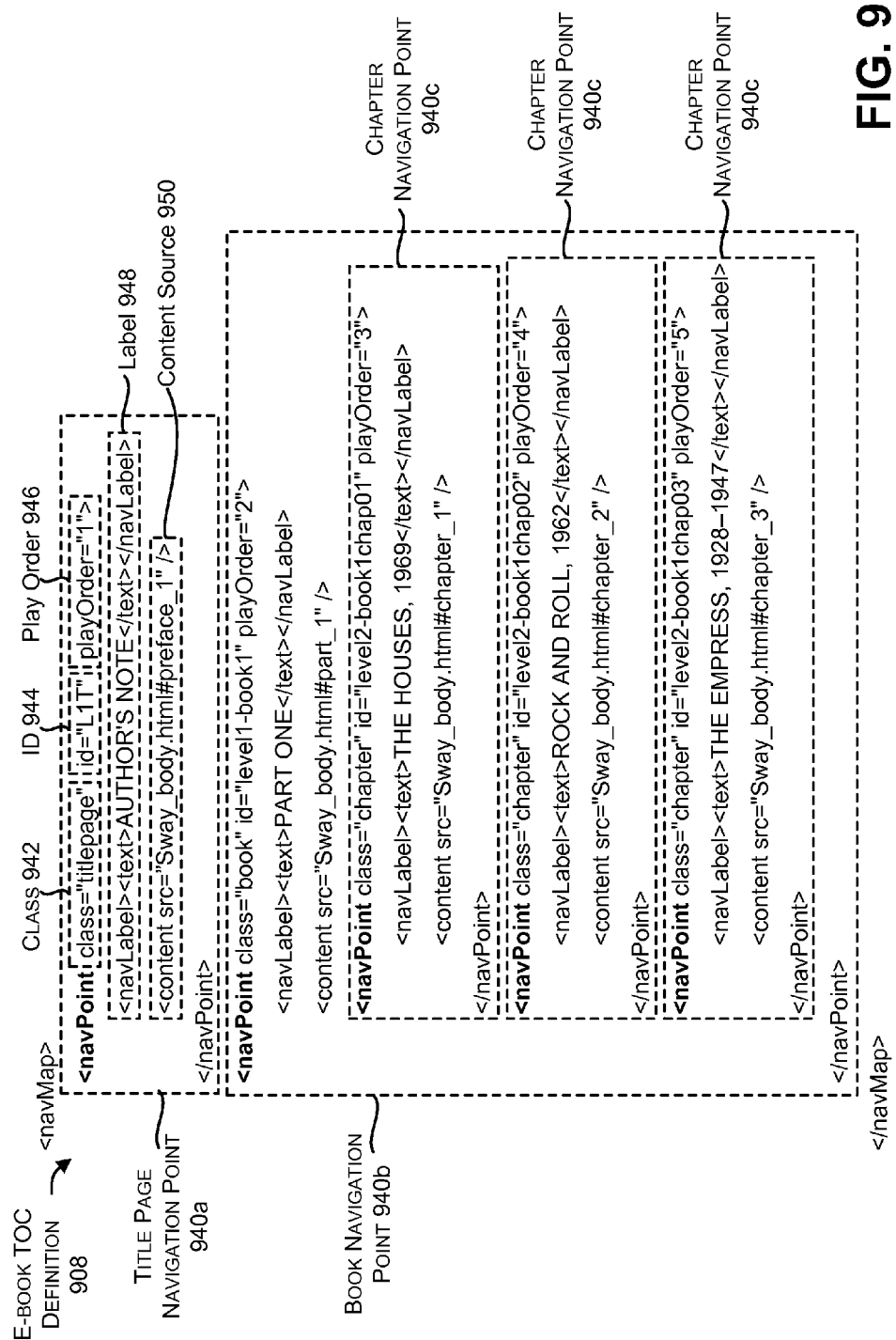
FIG. 9 illustrates an example of a table of contents (TOC) definition for an electronic book (e-book)

Reference is now made to FIG. 9. FIG. 9 illustrates an example of a table of contents (TOC) definition 908 for an e-book. The TOC definition 908 includes several different navigation points 940, which may correspond to different parts of an e-book. For example, the TOC definition 908 may include a title page navigation point 940a, a book navigation point 940*b*, and multiple chapter navigation points 940*c* within the book navigation point 940*b*. In this context, a navigation point 940 is a part of an item that a user may be interested in locating quickly.

Each navigation point 940 in the TOC definition 908 may include a class 942, an identifier 944, a play order 946, a label 948, a content source 950, and so forth. The class 942 may identify the type of navigation point 940. The identifier 944 may be used to distinguish a particular navigation point 940 from other navigation points 940. The play order 946 may indicate the position of the navigation point 940 relative to other navigation points 940 in an item. The label 948 may include the text that is displayed in the table of contents for the navigation point 940. The content source 950 may identify the location in the item file where the content corresponding to the navigation point 940 is stored.

Reference is now made to FIG. 10. FIG. 10 illustrates an example of a table of contents (TOC) table 1010. The TOC table 1010 may include the information that is contained within a TOC definition (e.g., such as the TOC definition 908 that is shown in FIG. 9). The TOC table 1010 may include a number of records 1052. Each record 1052 may correspond to a different navigation point within the corresponding TOC definition.

Each record 1052 may include an identifier field 1044, a title field 1054, a class field 1042, a level field 1056, a parent field 1058, a first child field 1060, a position field 1018, and a length field 1062. The identifier field 1044 may be used to distinguish a particular record 1052 from other records 1052 in the TOC table 1010. The title field 1054 may include the text that is included within the label of the navigation point in the TOC definition. Similarly, the class field 1042 may correspond to the class of the navigation point in the TOC definition. The level field 1056, parent field 1058, and first child field 1060 may indicate the relative position of the navigation point within the overall hierarchy of the table of contents. The position field 1018 may indicate where the contents corresponding to the navigation point are located within the corresponding item file, and the length field 1062 may include information about the size of such contents.

Figure 11:
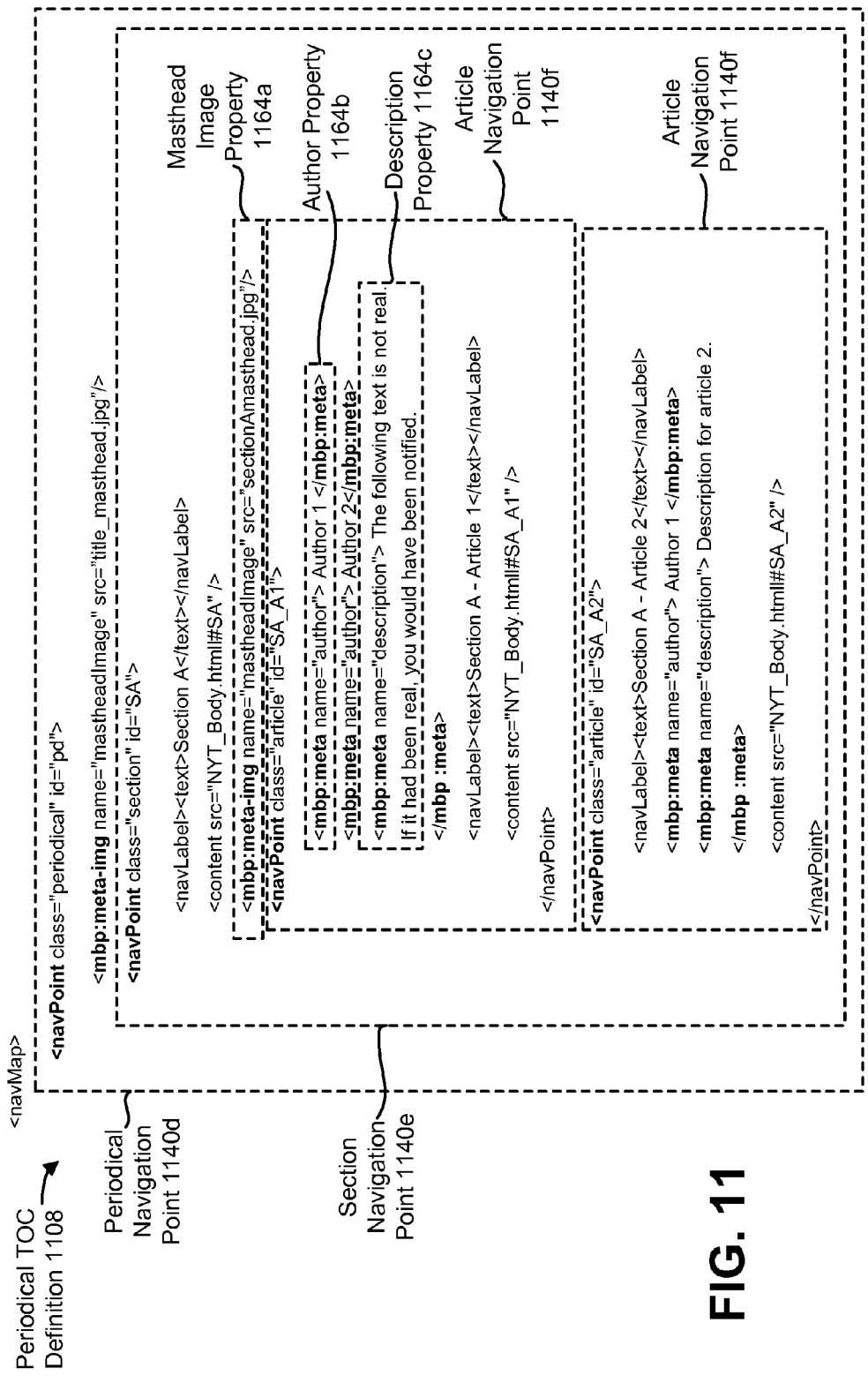
FIG. 11 illustrates an example of another TOC definition that corresponds to a periodical.

Reference is now made to FIG. 11. FIG. 11 illustrates an example of another TOC definition 1108. The TOC definition 1108 shown in FIG. 11 corresponds to a periodical (e.g., a magazine, a newspaper, etc.). The navigation points 1140 within a periodical may be different than the navigation points within an e-book. For example, a periodical may have different sections (e.g., a news section, a sports section, an entertainment section, etc.). Within each section, there may be one or more articles. Consequently, the periodical TOC definition 1108 may include multiple navigation points 1140 corresponding to these different parts of a periodical. In particular, the periodical TOC definition 1108 may include a periodical navigation point 1140*d*. Within the periodical navigation point 1140*d* there may be multiple section navigation points 1140*e*. Within some or all of the section navigation points 1140*e*, there may one or more article navigation points 1140*f*.

Each navigation point 1140 may include some of the same information that was discussed above in relation to the TOC definition 908 shown in FIG. 9. In addition, some of the navigation points 1140 may include properties 1164. Some examples of the types of properties 1164 that may be included within a navigation point 1140 include a masthead image property 1164*a*, an author property 1164*b*, a description property 1164*c*, etc.

The masthead image property 1164*a* may include an image that visually identifies the corresponding section navigation point 1140*e*. For example, if the section navigation point 1140*e* corresponds to the sports section of a newspaper, the masthead image property 1164*a* may include a sports-related image. The author property 1164*b* may include information about one or more authors of an article within a section. The description property 1164*c* may include information about a particular article (e.g., a summary of an article), and/or information about an entire section or group of sections.

Figure 12:
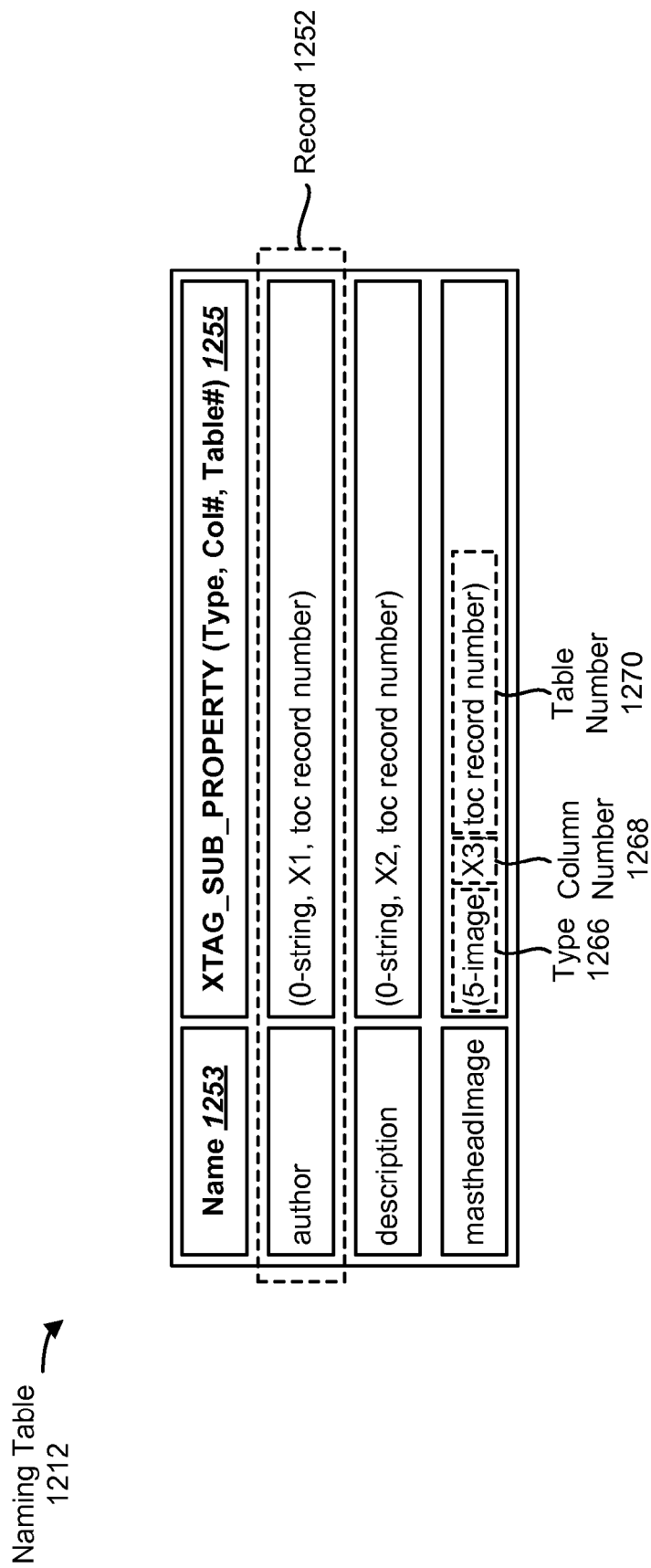
FIG. 12 illustrates an example of a naming table that may be created to store information about the various properties that are included within a TOC definition.

Reference is now made to FIG. 12. FIG. 12 illustrates an example of a naming table 1212. The naming table 1212 may be created to store information about the various properties that are included within a TOC definition. The naming table 1212 may include multiple records 1252. Each record 1252 may correspond to a particular property that is included within a TOC definition.

Each record 1252 may include a property name field 1253 and a property information vector field 1255 (which is labeled as "XTAG_SUB_PROPERTY" in FIG. 12). The property name field 1253 may include a descriptive name for the property. The property information vector field 1255 may include several pieces of information, including the type 1266, the column number 1268, and the table number 1270. The type 1266 may indicate whether the property is a string, an image, etc. The column number 1268 and the table number 1270 may indicate where information about the property is stored in a TOC table.

Reference is now made to FIG. 13. FIG. 13 illustrates an example of a TOC table 1310 corresponding to a TOC definition that includes properties (e.g., such as the TOC definition 1108 shown in FIG. 11). The TOC table 1310 may include some of the same fields as the TOC table 1010 shown in FIG. 10, namely an identifier field 1344, a title field 1354, a level field 1356, a parent field 1358, a first child field 1360*a*, a position field 1318, a length field 1362, and a class field 1342. Each record 1352 may also include a last child field 1360*b*. The last child field 1360*b* may be used along with the parent field 1358 and the first child field 1360*a* to determine the relative position of a particular navigation point in the overall hierarchy of a table of contents.

In addition to this information, the TOC table 1310 may also include information about the properties that are defined. In particular, each record 1352 may include values 1372 of the properties that have been defined. For example, where a TOC definition includes an author property (e.g., such as the author property 1164*b* in the TOC definition 1108 shown in FIG. 11), then the corresponding TOC table 1310 may include author property values 1372*a*. Similarly, where a TOC definition includes a description property and a masthead image property (e.g., such as the description property 1164*c* and the masthead image property 1164*a* in the TOC definition 1108 shown in FIG. 11), then the corresponding TOC table 1310 may include description property values 1372*b* and masthead image property values 1372*c*.

Figure 14:
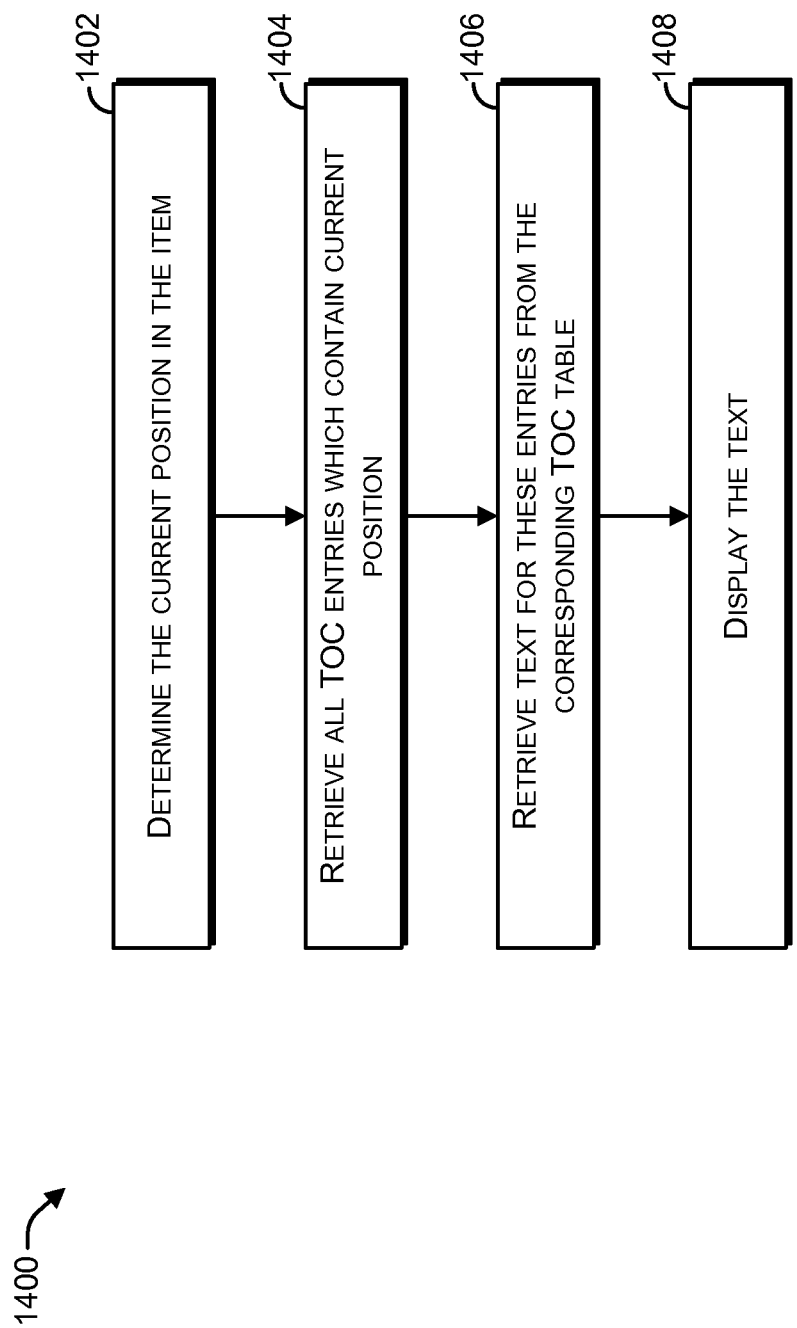
FIG. 14 illustrates an example of a method for displaying information about an item while a user is viewing the item.

Reference is now made to FIG. 14. FIG. 14 illustrates an example of a method 1400 for displaying information about an item while a user is reading the item. This method 1400 may be implemented by an item navigation module on an electronic device (e.g., the module 628 shown in FIG. 6) while the user is reading the item on the device. The method 1400 may be implemented in response to user input, or the method 1400 may be implemented automatically in response to one or more events that do not involve user input.

The method 1400 may include determining 1402 the current position in the item. For example, if the item has multiple pages, then the page that the user is currently viewing may be determined 1402.

The method 1400 may also include retrieving 1404 all TOC entries which contain the current position. This information may be retrieved 1404 from a reverse index of TOC entries. For example, suppose that the user is reading an article located within a specific section of a periodical. In this case, the article, the section, and the periodical may be retrieved via a reverse index of TOC entries. In addition, the text for these entries may be retrieved 1406 from a corresponding TOC table. The text may correspond to a title field within the TOC table.

Once the text for these entries has been retrieved 1406, then the text may be displayed 1408 to the user. The text may be displayed 1408 in a table of contents menu (e.g., the table of contents menu 736 shown in FIG. 7). Therefore the user is able to see where the part of the item (e.g., article, section, etc.) that he or she is reading fits within the overall structure of the item. Advantageously, this may be done without the user having to navigate all the way back to the table of contents, which is typically located at the beginning of an item.

Figure 15:
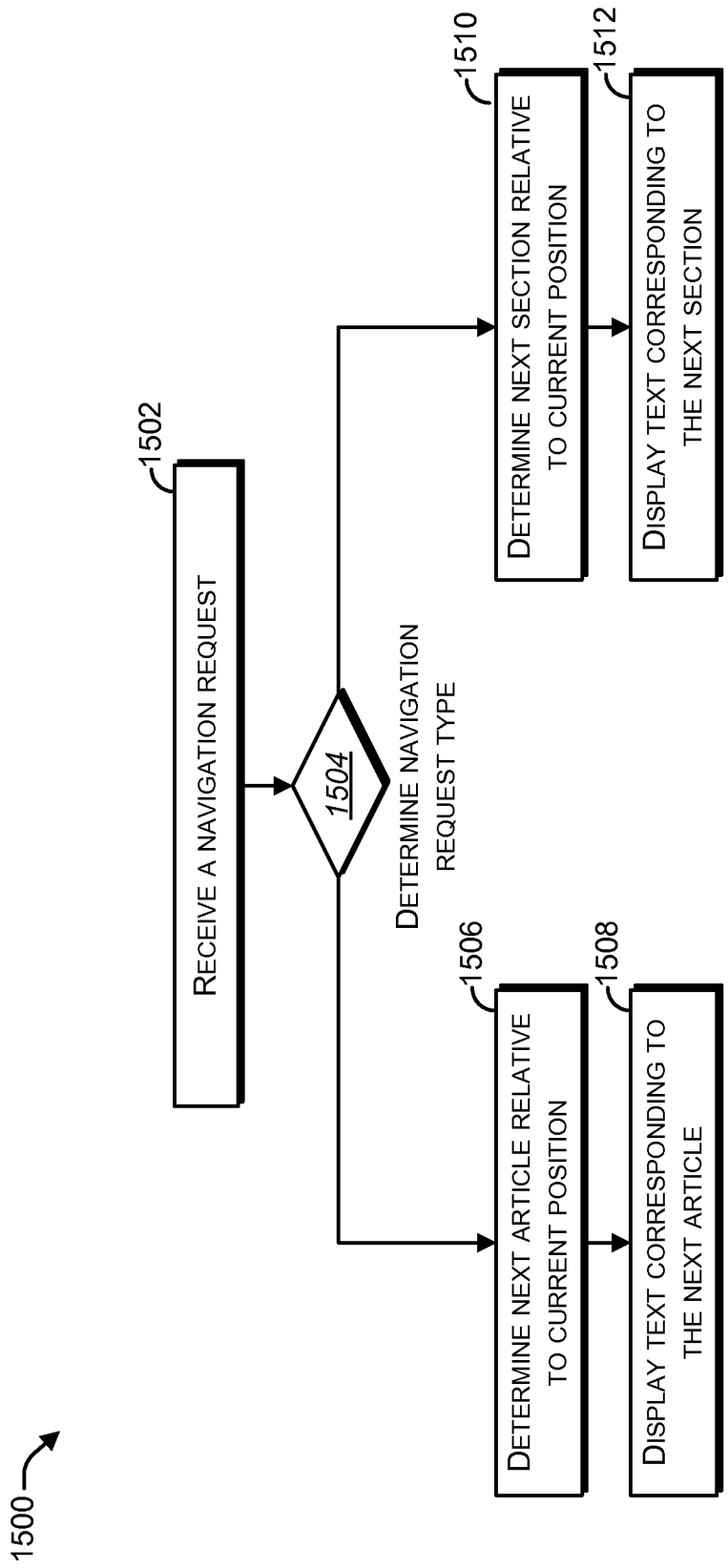
FIG. 15 illustrates an example of a method for moving to the next navigation point within an item.

Reference is now made to FIG. 15. FIG. 15 illustrates an example of a method 1500 for moving to the next navigation point within an item. The method 1500 may be implemented by an item navigation module on an electronic device (e.g., the module 630 shown in FIG. 6).

In the present discussion, it will be assumed that the user is viewing a periodical that includes sections and articles. However, the method 1500 is also applicable to other types of items, such as e-books.

At some point while an item (e.g., a periodical) is being displayed to a user, a navigation request may be received 1502. There are many different ways that a user may make a navigation request. In the present discussion, it will be assumed that there are at least two different types of navigation requests. A first type of navigation request (e.g., clicking on the five-way controller 506) may be associated with advancing to the next article within the periodical, and a second type of navigation request (e.g., clicking on and holding down the five-way controller 506) may be associated with advancing to the next section within the periodical.

In response to receiving 1502 the navigation request, the type of navigation request that was received 1502 may be determined 1504. In particular, it may be determined 1504 whether the user has requested to advance to the next article or to the next section in the periodical.

If it is determined 1504 that the user has requested to advance to the next article within the periodical, then the next article relative to the user's current position in the periodical may be determined 1506. The table-of-contents extensions described herein may make it possible to determine 1506 the next article relative to the user's current position. The text corresponding to the next article may then be displayed 1508.

If it is determined 1504 that the user has requested to advance to the next section within the periodical, then the next section relative to the user's current position in the periodical may be determined 1510. The table-of-contents extensions described herein may make it possible to determine 1510 the next section relative to the user's current position. The text corresponding to the next section (e.g., the first article in the next section) may then be displayed 1512.

Of course, the method 1500 may be implemented in connection with additional navigation requests other than those specifically described above. For example, instead of advancing to the next article or section within a periodical, the method 1500 may involve advancing to a different periodical. If the method 1500 is implemented in connection with e-books, then the method 1500 may involve advancing to the next chapter within an e-book, or to a different e-book.

Figure 16:
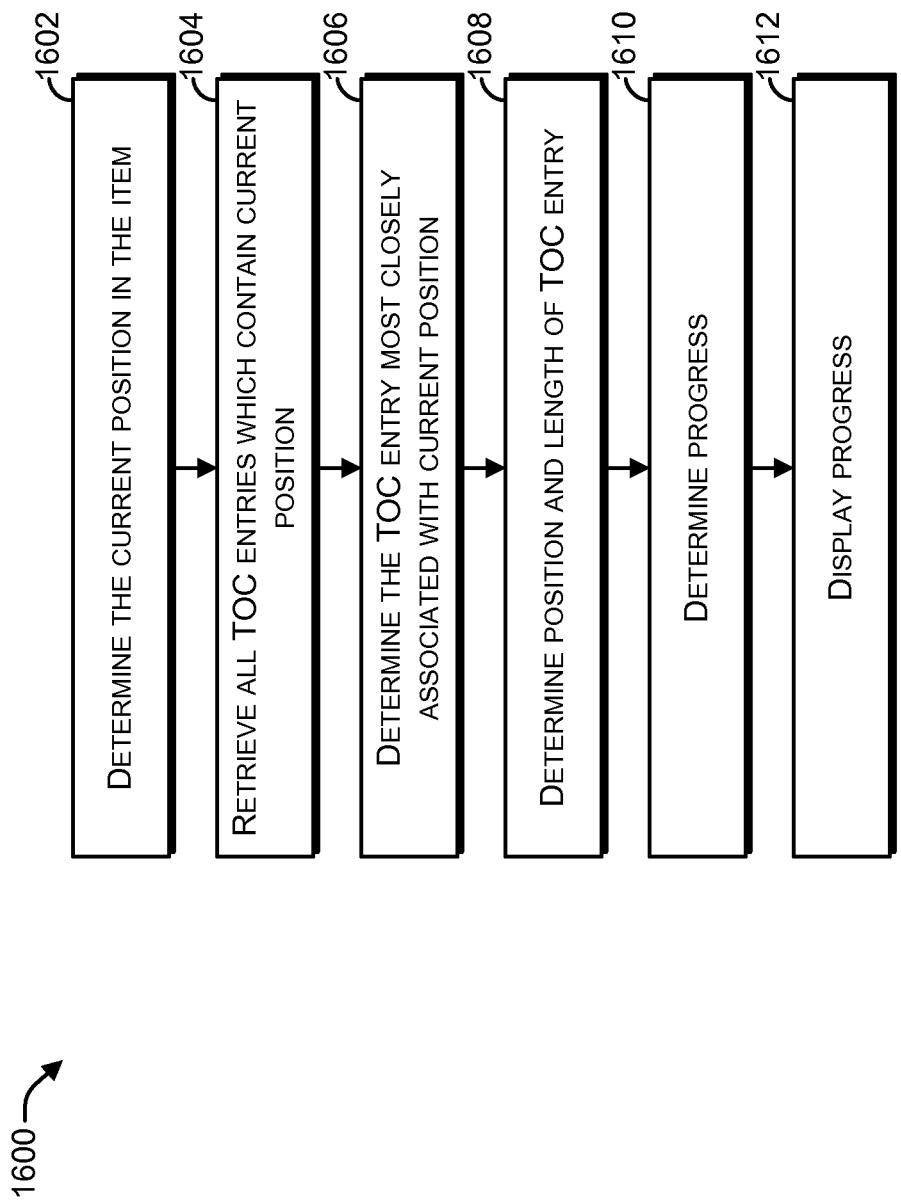
FIG. 16 illustrates an example of a method for displaying the user's progress within the part of an item that the user is viewing.

Reference is now made to FIG. 16. FIG. 16 illustrates an example of a method 1600 for displaying the user's progress within the part (e.g., chapter, section, article, etc.) of an item that the user is reading. The user's "progress" refers to some indication of how much of a part of an item has been read relative to how much remains to be read (e.g., if the user is one-quarter, one-half, or three-quarters of the way through an article, section, e-book, etc.). The method 1600 may be implemented by an item navigation module on an electronic device (e.g., the module 632 shown in FIG. 6). The method 1600 may be implemented in response to user input, or the method 1600 may be implemented automatically in response to one or more events that do not involve user input.

The method 1600 may include determining 1602 the current position in the item. The method 1600 may also include retrieving 1604 all TOC entries which contain the current position. This information may be retrieved 1604 from a reverse index of TOC entries.

Of those TOC entries that have been retrieved (i.e., those that contain the current position), the TOC entry that is most closely associated with the current position may be determined 1606. For example, suppose that the user is reading an article within a section, and that both the article and the section are listed in the table of contents (i.e., there is a TOC entry for the article and also a TOC entry for the section). Because the article is located within the section, further suppose that the article TOC entry is a child of the section TOC entry. In this example, both the section TOC entry and the article TOC entry are associated with the current position. However, because the article TOC entry is a child of the section TOC entry, the article TOC entry is more closely associated with the current position than the section TOC entry. Stated another way, the article TOC entry is "deeper" than the section TOC entry in the table of contents.

The position and length of the TOC entry that is most closely associated with the current position may be determined 1608. This may be accomplished using the position and length fields within the corresponding TOC table. From this, the user's progress may be determined 1610 and then displayed 1612.

The term "progress" may have different meanings in different contexts. For example, under some circumstances, the term "progress" may refer to how much of an entire item (e.g., an entire e-book) has been read. However, under other circumstances, the term "progress" may refer to how much of a particular part of an item (e.g., a section within a periodical) has been read.

Figure 17:
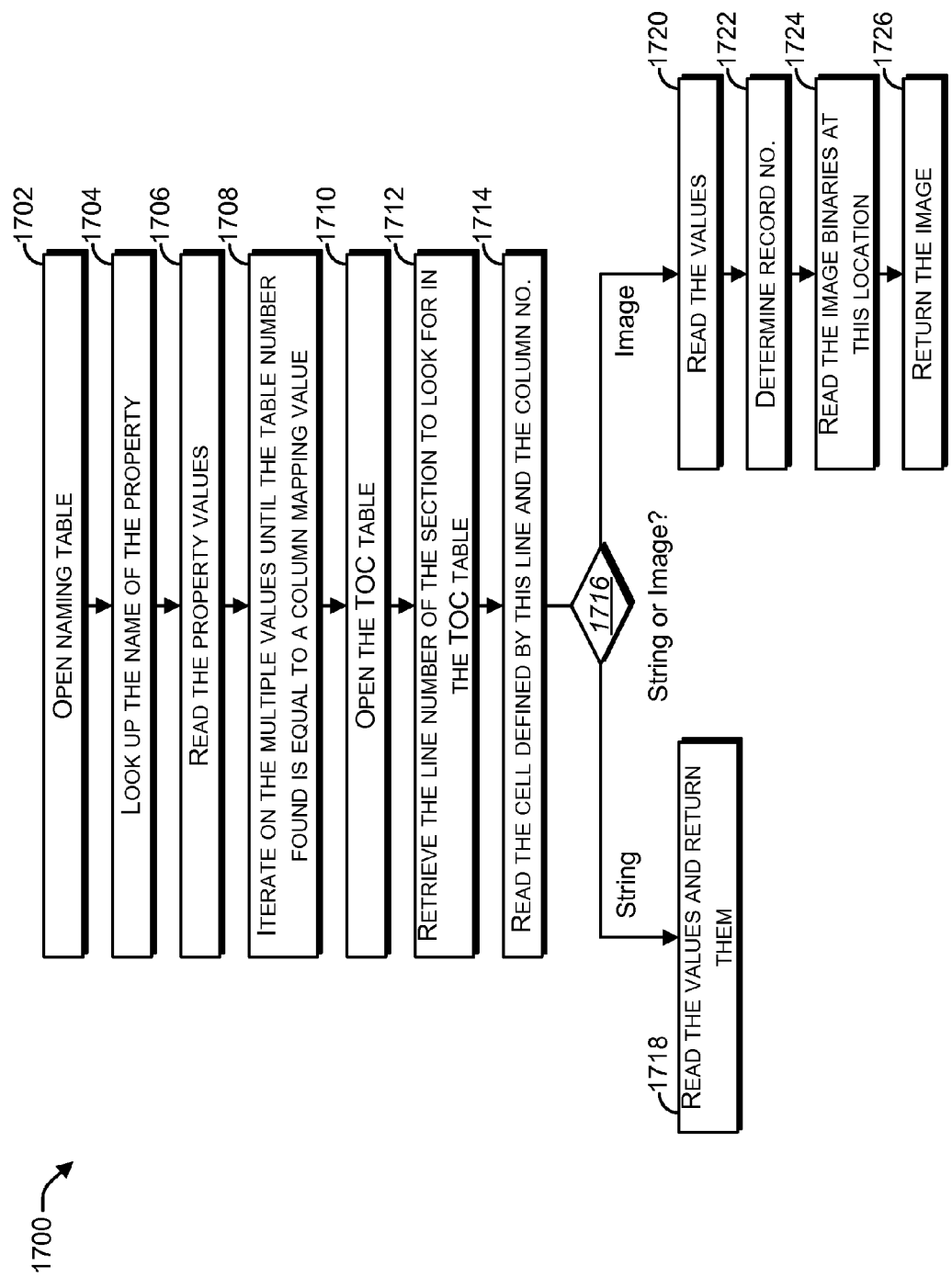
FIG. 17 illustrates an example of a method for retrieving a property value corresponding to a property that is included within a TOC definition.

Reference is now made to FIG. 17. FIG. 17 illustrates an example of a method 1700 for retrieving a property value corresponding to a property that is included within a TOC definition. The method 1700 may be implemented by an item navigation module on an electronic device. The method 1700 may be implemented as part of displaying a TOC menu (e.g., the TOC menu 736 shown in FIG. 7), where the corresponding TOC definition includes properties.

The method 1700 may include opening 1702 the appropriate naming table (e.g., the naming table 1212 shown in FIG. 12). The naming table may be identified in a header field within the item file. The method 1700 may also include looking up 1704 the name of the property, and reading 1706 the property values from the naming table (e.g., from a property information vector field, such as the field labeled "XTAG_SUB_PROPERTY" in FIG. 12).

The method 1700 may also include iterating 1708 on the multiple values until the table number found is equal to a column mapping value, which may also be identified in a header field within the item file. Then, the corresponding TOC table may be opened 1710. The line number of the section to look for in the TOC table may be retrieved 1712. Then the cell that is defined by this line and the appropriate column number may be read 1714.

It may then be determined 1716 whether the property is a string or an image. If the property is a string, the method 1700 may include reading 1718 the values and returning them. If the property is an image, then the method 1700 may include reading 1720 the values, determining 1722 an absolute record number where the image is stored (e.g., by adding the value of a predetermined parameter), reading 1724 the image binaries at this location, and returning 1726 the image.

Figure 18:
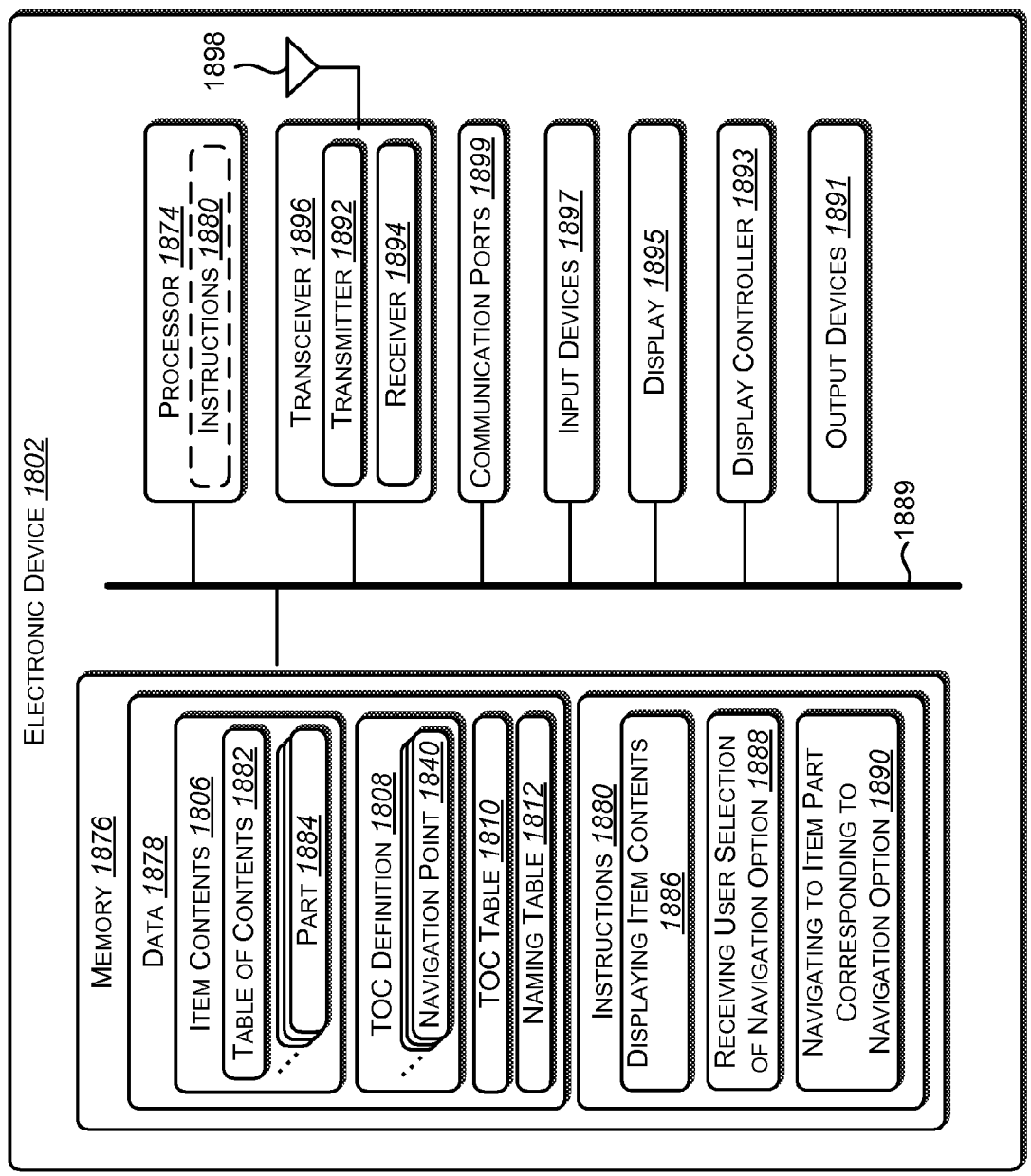
FIG. 18 illustrates certain components that may be included within an electronic device that is configured for providing table-of-contents extensions for items on the electronic device in accordance with the present disclosure.

Reference is now made to FIG. 18. FIG. 18 illustrates certain components that may be included within an electronic device 1802 that is configured for providing table-of-contents extensions for items on the electronic device 1802 in accordance with the present disclosure.

The electronic device includes a processor 1874. The processor 1874 may be a general purpose single- or multi-chip microprocessor (e.g., an ARM), a special purpose microprocessor (e.g., a digital signal processor (DSP)), a microcontroller, a programmable gate array, etc. The processor 1874 may be referred to as a central processing unit (CPU). Although just a single processor 1874 is shown in the electronic device 1802 of FIG. 18, in an alternative configuration, a combination of processors (e.g., an ARM and DSP) could be used.

The electronic device 1802 also includes memory 1876. The memory 1876 may be any electronic component capable of storing electronic information. The memory 1876 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1878 and instructions 1880 may be stored in the memory 1876. The instructions 1880 may be executable by the processor 1874 to implement various functions. Executing the instructions 1880 may involve the use of the data 1878 that is stored in the memory 1876.

Some examples of the data 1878 in the memory 1876 include: item contents 1806, table of contents 1882 within the item contents 1806, various parts 1884 of the item (e.g., chapters, sections, articles, etc.), which may be listed in the table of contents 1882 for the item, a TOC definition 1808, navigation points 1840 within the TOC definition 1808, a TOC table 1810, a naming table 1812, etc. Other types of data 1878 that are relevant to implementing the techniques described herein may also be included in the memory 1876.

Some examples of the instructions 1880 in the memory 1876 include: displaying 1886 contents 1806 of an item other than the table of contents 1882 for the item, receiving 1888 user selection of a navigation option while the contents 1806 of the item are being displayed, and instructions 1880 for navigating 1890 to the part 1884 of the item corresponding to the navigation option in response to the user's selection of the navigation option. Other instructions 1880 that are relevant to implementing the techniques described herein may also be included in the memory 1876.

The electronic device 1802 may also include a transmitter 1892 and a receiver 1894 to allow transmission and reception of signals between the electronic device 1802 and a remote location. The transmitter 1892 and receiver 1894 may be collectively referred to as a transceiver 1896. An antenna 1898 may be electrically coupled to the transceiver 1896. The electronic device 1802 may also include (not shown) multiple transmitters 1892, multiple receivers 1894, multiple transceivers 1896 and/or multiple antenna 1898.

The electronic device 1802 may also include one or more communication ports 1899 for communicating with other electronic devices. Communication with other electronic devices may occur directly and/or via a computer network. Some examples of communication ports 1899 include Ethernet ports, Universal Serial Bus (USB) ports, parallel ports, serial ports, etc.

The electronic device 1802 may also include one or more input devices 1897. Examples of input devices 1897 include a keyboard, mouse, remote control device, microphone, button, joystick, trackball, touchpad, lightpen, etc.

The electronic device 1802 may also include a display 1895. A display controller 1893 may also be provided, for converting data 1878 stored in the memory 1876 into text, graphics, and/or moving images (as appropriate) shown on the display 1895.

The display 1895 may be an electronic paper display, which is a display that is capable of holding text and images indefinitely without drawing electricity, while allowing the text and images to be changed later. There are several different technologies that may be used to create an electronic paper display, including electrophoretic display technology, bistable liquid crystal display (LCD) technology, cholesteric LCD display technology, etc. Alternatively, the display 1895 may utilize another image projection technology, such as liquid crystal display (LCD), gas plasma, light-emitting diode (LED), etc. One or more other output devices 1891, such as audio speakers, may also be included in the electronic device 1802.

The various components of the electronic device 1802 may be coupled together by one or more buses, which may include a power bus, a control signal bus, a status signal bus, a data bus, etc. For the sake of clarity, the various buses are illustrated in FIG. 18 as a bus system 1889.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "electronic device 602" refers to the specific electronic device that is shown in FIG. 6. However, the use of "electronic device" without a reference number refers to any electronic device that is appropriate for the context in which the term is used, and is not limited to any particular electronic device shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic book (e-book) reader, comprising:
   an electronic paper display to display contents of an electronic book other than a table of contents for the electronic book, the electronic paper display being configured to maintain display of content without drawing electricity and to allow the content that is displayed to be changed;
   a processor; and
   memory in electronic communication with the processor, the memory including instructions stored therein, the instructions executable to:
     determine a portion of the contents of the electronic book that is currently being displayed on the electronic paper display;
     determine an entry, from the table of contents for the electronic book, that matches a preceding or subsequent portion of the contents of the electronic book with respect to the portion of the contents of the electronic book that is currently being displayed;
     provide for display on the electronic paper display, without navigating to the table of contents, a menu that covers at least a segment of the portion of the contents of the electronic book that is currently being displayed, the menu displayed with a navigation option that includes matching text of the entry from the table of contents for the electronic book;
     receive user selection of the navigation option while the portion of contents of the electronic book is displayed;
     in response to receiving the user selection of the navigation option, access a table of contents table stored on the e-book reader, the table of contents table matching a table of contents definition that includes a plurality of navigation points defined therein; and
     navigate to the preceding or subsequent portion of the contents of the electronic book based on information that is contained within the table of contents table.

2. A method, comprising:
   providing for display, on an electronic paper display that is configured to maintain display of content without drawing electricity and to allow the content that is displayed to be changed, contents of an electronic book other than a table of contents for the electronic book;
   determining a portion of the contents of the electronic book that is currently being provided for display on the electronic paper display;
   determining an entry, from the table of contents for the electronic book, that matches a preceding or subsequent portion of the contents of the electronic book with respect to the portion of the contents of the electronic book that is currently being provided for display;

providing for display, on the electronic paper display and without navigating to the table of contents, a menu that partially covers the portion of the contents of the electronic book that is currently being provided for display, the menu displayed with a navigation option that includes text matching the entry from the table of contents for the electronic book;

receiving user selection of the navigation option while the portion of the contents of the electronic book is displayed; and navigating to the preceding or subsequent portion of the contents of the electronic book in response to receiving the user selection of the navigation option.

3. The method of claim 2, wherein the navigation option corresponds to a chapter of the electronic book.

4. The method of claim 2, wherein the navigation option corresponds to an article within the electronic book.

5. The method of claim 2, wherein the navigation option corresponds to a section within the electronic book.

6. The method of claim 2, wherein the menu is a navigation menu and the user selection of the navigation option is received via the navigation menu.

7. The method of claim 2, wherein the user selection of the navigation option is received via a keyboard shortcut.

8. The method of claim 2, further comprising displaying information about the user's progress within the electronic book.

9. The method of claim 2, wherein the method is implemented with an electronic device, and the method further comprising:
accessing a table of contents table stored on the electronic device, the table of contents table matching a table of contents definition that includes a plurality of navigation points defined therein.

10. The method of claim 9, wherein the table of contents definition further includes at least one property defined therein.

11. The method of claim 2, wherein the method is implemented with an electronic book (e-book) reader.

12. The method of claim 2, further comprising:
upon determining the portion of the contents of the electronic book that is currently being provided for display, determining a progress within the electronic book based at least in part on a position field within the table of contents for the portion of the contents of the electronic device that is currently being provided for display; and
providing for display, on the electronic paper display, the progress within the electronic book.

13. An electronic device, comprising:
an electronic paper display to display contents of an electronic book other than a table of contents for the electronic book, the electronic paper display being configured to maintain display of content without drawing electricity and to allow the content that is displayed to be changed;
a processor; and
memory in electronic communication with the processor, the memory including instructions stored therein, the instructions executable to:
determine a portion of the contents of the electronic book that is currently being displayed on the electronic paper display;
determine an entry, from the table of contents for the electronic book, that matches a preceding or subsequent portion of the contents of the electronic book with respect to the portion of the contents of the electronic book that is currently being displayed;
provide for display, on the electronic paper display and without navigating to the table of contents, a menu over at least a segment of the portion of the contents of the electronic book that is currently being displayed while the portion of the contents of the electronic book is displayed, the menu displayed with a navigation option that matches information of the entry from the table of contents for the electronic book;
receive user selection of the navigation option while the portion of the contents of the electronic book is displayed; and
navigate to the preceding or subsequent portion of the contents of the electronic book in response to receiving the user selection of the navigation option.

14. The electronic device of claim 13, wherein the menu is a navigation menu, and wherein the user selection of the navigation option is received via the navigation menu.

15. The electronic device of claim 13, wherein the instructions are also executable to access a table of contents table stored on the electronic device, and wherein the table of contents table matches a table of contents definition that includes a plurality of navigation points defined therein.

16. The electronic device of claim 13, wherein the electronic device is an electronic book (e-book) reader.

17. A non-transitory computer-readable medium, the computer-readable medium comprising executable instructions for:
providing for display, on an electronic paper display configured to maintain display of content without drawing electricity and to allow the content that is displayed to be changed, contents of an electronic book other than a table of contents for the electronic book;
determining a portion of the contents of the electronic book that is currently displayed on the electronic paper display;
providing for display, on the electronic paper display, a menu over at least part of the portion of the contents of the electronic book that is currently displayed while the portion of the contents of the electronic book is displayed, the menu displayed with information of an entry from the table of contents for the electronic book, the entry matching a next or previous portion of the electronic book relative to the portion of the contents of the electronic book that is currently displayed;
receiving user selection of the information of the entry included in the menu while the portion of the contents of the electronic book is displayed; and
navigating to the next or previous portion of the electronic book in response to receiving the user selection of the information of the entry.

18. The non-transitory computer-readable medium of claim 17, wherein the menu is a navigation menu, and wherein the user selection is received via the navigation menu.

19. The non-transitory computer-readable medium of claim 17, wherein the executable instructions are executed on an electronic device, and the computer-readable medium further comprises executable instructions for:
accessing a table of contents table stored on the electronic device, the table of contents table corresponding to a table of contents definition that includes a plurality of navigation points defined therein.

20. The non-transitory computer-readable medium of claim 17, wherein the executable instructions are executed on an electronic book (e-book) reader.

21. A method, comprising:
- providing for display, on an electronic paper display configured to maintain display of content without drawing electricity and to allow the content that is displayed to be changed, contents of an electronic book other than a table of contents for the electronic book;
- determining a portion of the contents of the electronic book that is currently displayed on the electronic paper display;
- providing for display, on the electronic paper display and without navigating to the table of contents, a menu over at least a segment of the portion of the contents of the electronic book that is currently displayed while the portion of the contents of the electronic book is displayed, the menu displayed with text associated with an entry from the table of contents for the electronic book, the entry matching a next or previous portion of the contents of the electronic book relative to the portion of the contents of the electronic book that is currently displayed;
- receiving user selection of the text associated with the entry while the portion of the contents of the electronic book is displayed; and
- navigating to the next or previous portion of the contents of the electronic book in response to receiving the user selection of the text associated with the entry.

22. The method of claim 21, wherein the method is implemented with an electronic book (e-book) reader.

* * * * *